United States Patent
Ide

(10) Patent No.: US 9,846,488 B2
(45) Date of Patent: Dec. 19, 2017

(54) MOTION-CORRELATION CONTROL SYSTEM TO CONTROL COMMUNICATION OF A WEARABLE DEVICE

(71) Applicant: Sony Mobile Communications Inc., Tokyo (JP)

(72) Inventor: Yuji Ide, Tokyo (JP)

(73) Assignee: Sony Mobile Communications Inc., Tokyo (JP)

( * ) Notice: Subject to any disclaimer, the term of this patent is extended or adjusted under 35 U.S.C. 154(b) by 97 days.

(21) Appl. No.: 14/796,184

(22) Filed: Jul. 10, 2015

(65) Prior Publication Data
US 2017/0010674 A1    Jan. 12, 2017

(51) Int. Cl.
| | |
|---|---|
| G06F 3/01 | (2006.01) |
| H04B 13/00 | (2006.01) |
| H04W 4/00 | (2009.01) |
| H04W 4/02 | (2009.01) |
| H04W 12/06 | (2009.01) |
| G08C 17/02 | (2006.01) |

(52) U.S. Cl.
CPC .............. *G06F 3/017* (2013.01); *G08C 17/02* (2013.01); *H04B 13/005* (2013.01);
(Continued)

(58) Field of Classification Search
CPC .......... G06F 3/017; G06F 21/45; G06F 21/35; G06F 1/1694; G08C 17/02;
(Continued)

(56) References Cited

U.S. PATENT DOCUMENTS

| | | | |
|---|---|---|---|
| 7,202,773 B1* | 4/2007 | Oba .................. | G07C 9/00007 340/5.8 |
| 8,849,200 B2* | 9/2014 | Svensson ............. | H04W 12/00 345/158 |

(Continued)

FOREIGN PATENT DOCUMENTS

| | | |
|---|---|---|
| EP | 2 882 174 | 6/2015 |
| JP | 2000-200315 | 7/2000 |
| WO | WO 2015/065494 A1 | 5/2015 |

OTHER PUBLICATIONS

Extended Search Report issued Nov. 16, 2016 in European Patent Application No. 15188237.0.

*Primary Examiner* — Ali Neyzari
(74) *Attorney, Agent, or Firm* — Oblon, McClelland, Maier & Neustadt, L.L.P.

(57) ABSTRACT

An apparatus and method for communicating between a first device and second device, where each device includes a motion sensor. Communication functions are triggered by comparing motion data derived from each device. For example, when the first device is worn on a user's wrist (e.g., a smartwatch) and the second device (e.g., a smartphone) is held in the user's hand corresponding to the user's wrist, then moving the hand and devices results in correlated motion data between the devices. This correlated motion indicates the devices correspond to the same user. Further, human-body communication between the devices provides additional indicia that the devices correspond to the same user. Thus, based on the above-identified correlated motion and human-body communication the same user can be inferred and predefined communication task between the devices can be performed, such as unlocking the devices, exchanging identification codes, or exchanging other information.

20 Claims, 20 Drawing Sheets

(52) U.S. Cl.
CPC ........... *H04W 4/008* (2013.01); *H04W 4/027* (2013.01); *H04W 12/06* (2013.01); *G08C 2201/32* (2013.01)

(58) Field of Classification Search
CPC . G08C 2201/32; H04B 13/005; H04W 4/008; H04W 12/06; H04W 4/027
USPC ........................................ 340/12.5; 445/41.1
See application file for complete search history.

(56) References Cited

U.S. PATENT DOCUMENTS

| | | | |
|---|---|---|---|
| 8,867,995 B2* | 10/2014 | Kim | H04B 13/005 345/163 |
| 9,489,511 B2* | 11/2016 | Rodzevski | G06F 21/35 |
| 9,591,682 B2* | 3/2017 | Åstrand | G07C 9/00309 |
| 2012/0289213 A1* | 11/2012 | Levien | H04W 4/16 455/417 |
| 2013/0065517 A1 | 3/2013 | Svensson et al. | |
| 2014/0325614 A1 | 10/2014 | Rhelimi | |
| 2015/0161374 A1 | 6/2015 | Kim | |
| 2015/0161377 A1 | 6/2015 | Trodzevski et al. | |
| 2015/0162994 A1 | 6/2015 | Rodzevski et al. | |
| 2015/0163221 A1 | 6/2015 | Bolin et al. | |
| 2016/0249211 A1 | 8/2016 | Åstrand et al. | |
| 2016/0277891 A1 | 9/2016 | Dvortsov et al. | |
| 2016/0286587 A1 | 9/2016 | Åstrand et al. | |

\* cited by examiner

MOTION-CORRELATION CONTROL SYSTEM TO CONTROL COMMUNICATION OF A WEARABLE DEVICE

BACKGROUND

Field

This invention relates to a control system whereby wearable technology interfaces with devices including a wearable-technology-communication terminal, and more specifically to control system whereby correlated motion between the wearable technology and the wearable-technology-communication terminal is used to unlock and/or otherwise connect the wearable technology to the wearable-technology-communication terminal.

Description of the Related Art

In recent years, the wearable devices such as smart watches and wrist wearable fitness trackers have been developed and have gained in popularity. Some of these wearable technologies can be worn on the wrist of a user. For example, a smartwatch worn a user's wrist can be used to display the time and receive email messages.

Additionally, the smartwatch can include motion sensors to detect the motion of a user as well as determining the user's walk state. Further, a smart watch can perform near field communications with surrounding devices such as a smartphone or a Bluetooth® headset. Through this near field communication, data from the wearable device can be transferred from the wearable device and stored on a smartphone, or vice versa. Wearable technology such as a smartwatch can also be used to communicate over a voice link either through wireless communication (e.g., near field communication) with the smartphone or with a telephone base station. Methods of wireless communication used with wearable technology can include, for example, Bluetooth®, WiFi®, and wireless Local Area Networks (LANs).

SUMMARY

Brief Description of the Drawings

A more complete understanding of this disclosure is provided by reference to the following detailed description when considered in connection with the accompanying drawings, wherein.

DETAILED DESCRIPTION

Wearable terminals and technology, such as smartwatches, realize some of their functionality by executing the same types of applications performed by smartphones. However, by virtue of the wearable terminal being affixed to the body of the user, the connection between a wearable terminal and the user creates additional functionality not present in devices such as smartphones. For example, motion sensors, such as accelerometers and gyroscopes, can be used to detect and track the user's activity level (e.g., in a fitness tracker) and the user's wake/sleep state. Additionally, the user's movements and physical contact with the wearable terminal can be used to provide additional functionality. For example, the fact that a wearable terminal worn on the wrist moves with the user's hand can be used to improve the easy with which various operations, such as unlocking a handheld device, are performed. An objective of the system, apparatus, and methods described herein is to use the additional functionality created through wearable terminals to carry out operations not previously feasible before the advent wearable terminals, such as smartwatches.

In one implementation, a wearable device (e.g., a smartphone) 100 performs communication with another nearby electronic device that is a counterpart device. For example, the wearable device and the counterpart device can communicate using human-body communication. In one implementation, the counterpart device is a portable electronic device 200 that is held in the hand of a user and the wearable device 100 is worn on the wrist of the user corresponding to the hand holding the portable electronic device 200. The user moves the portable electronic device 200 by, e.g., shaking the hand that holds the portable electronic device 200. At this time, if the motion detected by a motion sensor of the portable electronic device 200 and the motion detected by a motion sensor of the wearable device 100 are similar to each other (or are synchronized with each other), the wearable terminal will issue a certain instruction to the terminal 200. For example, the wearable device will issue an instruction to unlock the terminal 200 to unlock the portable electronic device 200.

Figure 1:
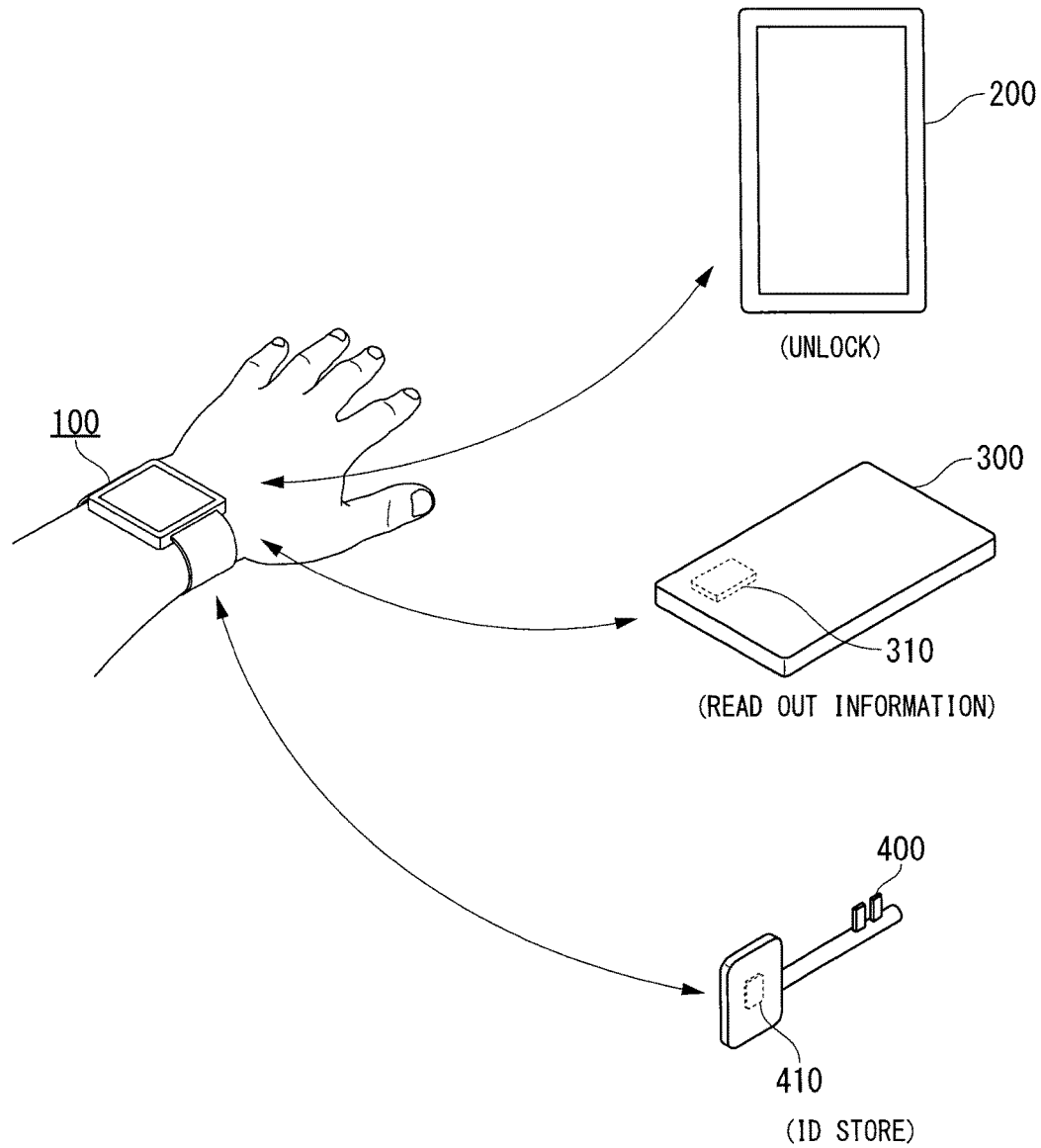
FIG. 1 shows a drawing of an implementation of communication between a wearable device and one of a portable electronic device, a battery-powered device and a key.

Referring now to the drawings, wherein like reference numerals designate identical or corresponding parts throughout the several views, FIG. 1 shows a wearable device 100 that is configured to be wearable on a wrist of a user. In FIG. 1, the wearable device 100 is shown on the wrist of user. In one implementation, the wearable device 100 includes a human-body-communication function in which the human body is used as a transmission line to transmit communication signals. Through a combination of grasping various devices in the users hand and shaking the grasped device, communication can be established between the wearable device 100 and the grasped device by using a combination of human-body communication and determining the correlation between the movement of the wearable device 100 and the device grasped in the user's hand.

For example, the user can grasp in the user's hand a portable electronic device 200 to establish human-body communication between the portable electronic device 200 and the wearable device 100. The user then simultaneously shakes the portable electronic device 200 and the wearable device 100 by moving the hand that both wears the wearable device 100 and grasps the portable electronic device 200. Motion sensors in the wearable device 100 measure the motion of the wearable device 100, while motion sensors in the portable electronic device 200 measure the motion of the portable electronic device 200. The motions of the two devices are compared. When they are shaken using the same hand, comparing the motion of the wearable device 100 with the motion of the portable electronic device 200 reveals that they are being shaken together simultaneously, and the portable electronic device 200 is unlocked. The comparison between the motion of the wearable device 100 and the motion of the portable electronic device 200 can be, for example, whether the motions are similar (e.g., they have the same motion pattern but not necessarily synchronized) or whether the two motions are synchronized (e.g., their accelerations are in synchrony). If the two motions match (e.g., are similar or are synchronized), then, in one implementation, the wearable device 100 sends, using the human-body-communication functionality, an unlocking command to the portable electronic device 200, whereby the portable electronic device 200 is unlocked with respect to the wearable device 100, and the portable electronic device 200 can be accessed and exchange information with the wearable device 100 after being unlocked.

In another example, the user grasps by the hand a battery-powered device 300 to establish human-body communication between the battery-powered device 300 and the wearable device 100. The user then simultaneously shakes the battery-powered device 300 and the wearable device 100 by moving the hand that both grasps the battery-powered device 300 wears the wearable device 100. Motion sensors in the wearable device 100 measure the motion of the wearable device 100, and motion sensors in the battery-powered device 300 measure the motion of the battery-powered device 300. The motions of the two devices are compared. If comparing the motion of the wearable device 100 with the motion of the battery-powered device 300 reveals that they are being shaken together simultaneously, then the wearable device 100 sends an inquiry to the battery-powered device 300 requesting information regarding how much remaining charge is on the battery. In one implementation, this inquiry signal is sent to the battery-powered device 300 using human-body communication. In one implementation, when the battery-powered device 300 receives the information request, the battery-powered device 300 responds by sending a signal indicating the residual battery energy, and the wearable device 100 displays a message communicating the signaled residual battery energy.

In a third example, the user grasps by the hand a key 400 to establish human-body communication between the key 400 and the wearable device 100. The user then simultaneously rotates or otherwise moves both the key 400 and the wearable device 100 by, e.g., moving the hand that simultaneously grasps the key 400 wears the wearable device 100. Motion sensors in the wearable device 100 measure the motion of the wearable device 100, and motion sensors in the key 400 measure the motion of the key 400. The motions of the two devices are compared. If comparing the motion of the wearable device 100 with the motion of the key 400 reveals that they are being moved together (e.g., the two motions are similar or synchronized), then the wearable device 100 sends a specific code (e.g., an identification (ID) code) to the key 400 using, e.g., the human-body communication. The key 400 receives the ID code and the wearable-device-communication terminal 410 stores the ID code in memory.

In one embodiment, the wearable device 100 respectively communicates with the portable electronic device 200, the battery-powered device 300, and the key 400 using human-body communication. However, this is only one example of how the wearable device 100 can communicate with other devices. In one implementation, the wearable device 100 communicates with other devices, such as the portable electronic device 200, the battery-powered device 300, and the key 400, using Bluetooth®. In one implementation, the wearable device 100 communicates with other devices, such as the portable electronic device 200, the battery-powered device 300, and the key 400, using a wireless LAN.

Figure 2:
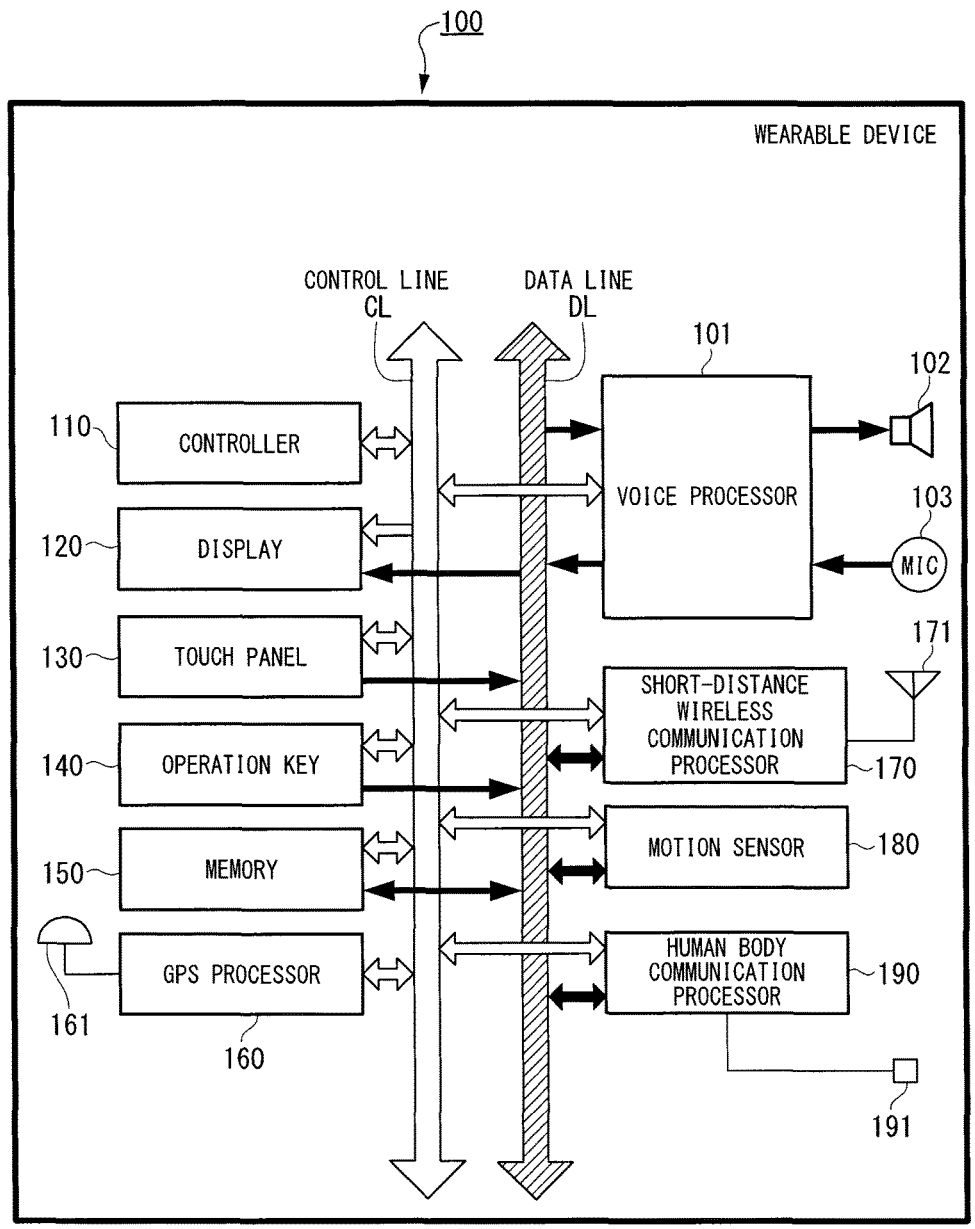
FIG. 2 shows a schematic diagram of an implementation of the wearable device.

FIG. 2 shows an example of the wearable device 100. For example, the wearable device 100 can be a smartwatch. The wearable device 100 can include a voice processor 101 that is electrically connected to a microphone 103 and a speaker 102, and the voice processor 101 is configured to acquire voice and audio signals from the microphone 103 using, for example, amplification circuits, analog-to-digital converters, and analog and/or digital signal processing. The voice processor 101 can further be configured to supply audio outputs to the speaker 103.

Additionally, the wearable device 100 can include a short-distance wireless communication processor 170 and corresponding short-distance wireless antenna 171. In one implementation, the short-distance wireless communication processor 170 is a communication processing part that, for example, performs wireless communications in accordance with the IEEE 802.11 standard. In one implementation, the short-distance wireless communication processor 170 that performs wireless communications using the IEEE 802.11 standard also performs wireless communications using wireless signals having a frequency of 2.4 GHz or 5 GHz. The antenna 171 is electrically connected to the short-distance wireless communication processor 170. Further, the short-distance wireless communication processor 170 can be equipped with the functionality to perform near field communication using Bluetooth®, for example.

A motion sensor 180 is included in the wearable device 100 to detect a motion of the wearable device 100. The motion sensor 180 can include, for example, one or more acceleration sensors detecting linear acceleration and one or more gyroscopic sensors detecting angular velocity.

The wearable device 100 can further include a human-body-communication processor 190 that interactively communicates with other apparatuses and devices using the human body as a transmission line. In the human-body communication, the electrode 191 electrically contacts or is in close proximity to the body of the user to transmit electrical signals through the body of the user. For example, electric signals can be coupled into a conduction layer in the human body using galvanic or capacitive coupling. Thus, an electrical file is induced onto the human body in order to propagate a signal between devices (e.g. the wearable device 100 and another device) that are in direct contact or in sufficiently close proximity to a human body to establish electromagnetic coupling to the body. In one implementation, human-body communication performed by the human-body-communication processor 190 is possible when the electrode 191 is touching the skin of the human body directly, or when the electrode 191 is contacting the human body either directly or through clothing, and human-body communication cannot be performed if the electrode of the wearable device 100 does not directly contact a human body.

The wearable device 100 can further include a display 120. For example, the display can be a liquid crystal display panel or an organic electroluminescence display panel, and the display 120 is arranged within the wearable device 100. The display 120 can communicate information such as alphanumeric characters and/or digital images. Further, the wearable device 100 can include a touch panel 130 with a touch sensor to detect the touch of the surface of a display panel such as the display 120. In one implementation, the touch panel 130 is arranged integrally with the display panel that is equipped in the display 120. For example, the touch panel 130 detects the touch of a user's finger or the touch of a pen or stylus. The data obtained from the touch panel 130 can then be transmitted to the controller 110.

In one implementation, the controller 110 controls each part of the wearable device 100 in accordance with data received from the touch panel 130 and/or the operation key 140. Moreover, the motion data received from the motion sensor 180 can be wirelessly transmitted using the short-distance wireless communication processor 170 to another device that is also under the control of the controller 110. A program, which is run using the controller 110, can be stored in the memory 150. A GPS antenna 161 can be connected to the GPS processor 160. The GPS processor 160 receives, for example, satellite signals including information indicative of the coordinates of the wearable device 100 using the Global Positioning System (GPS), and this GPS information is used to determine the present location of the wearable device 100. The GPS processor 160 can, for example, signal the present location to the controller 110.

Further, the wearable terminal 100 is equipped with a control line CL and a data line DL. In one implementation, the control line CL and data line DL are each internal bus lines. Control data from the controller 110 is transmitted using the control line CL. The data line DL is used, for example, for the transmission of voice data and display data. In addition, although the internal structure of the portable electronic device 200 shown in FIG. 1 is not shown in FIG. 2, in one implementation, the fundamental structure of the portable electronic device 200 is the same as the structure of the wearable device 100 shown in FIG. 2. In the case of the portable electronic device 200, in addition to the structure shown in FIG. 2, the wireless communication processor can also perform wireless communications with a base station for radio telephones and the portable electronic device 200 can also include a camera and other additional components and functionalities.

Figure 3:
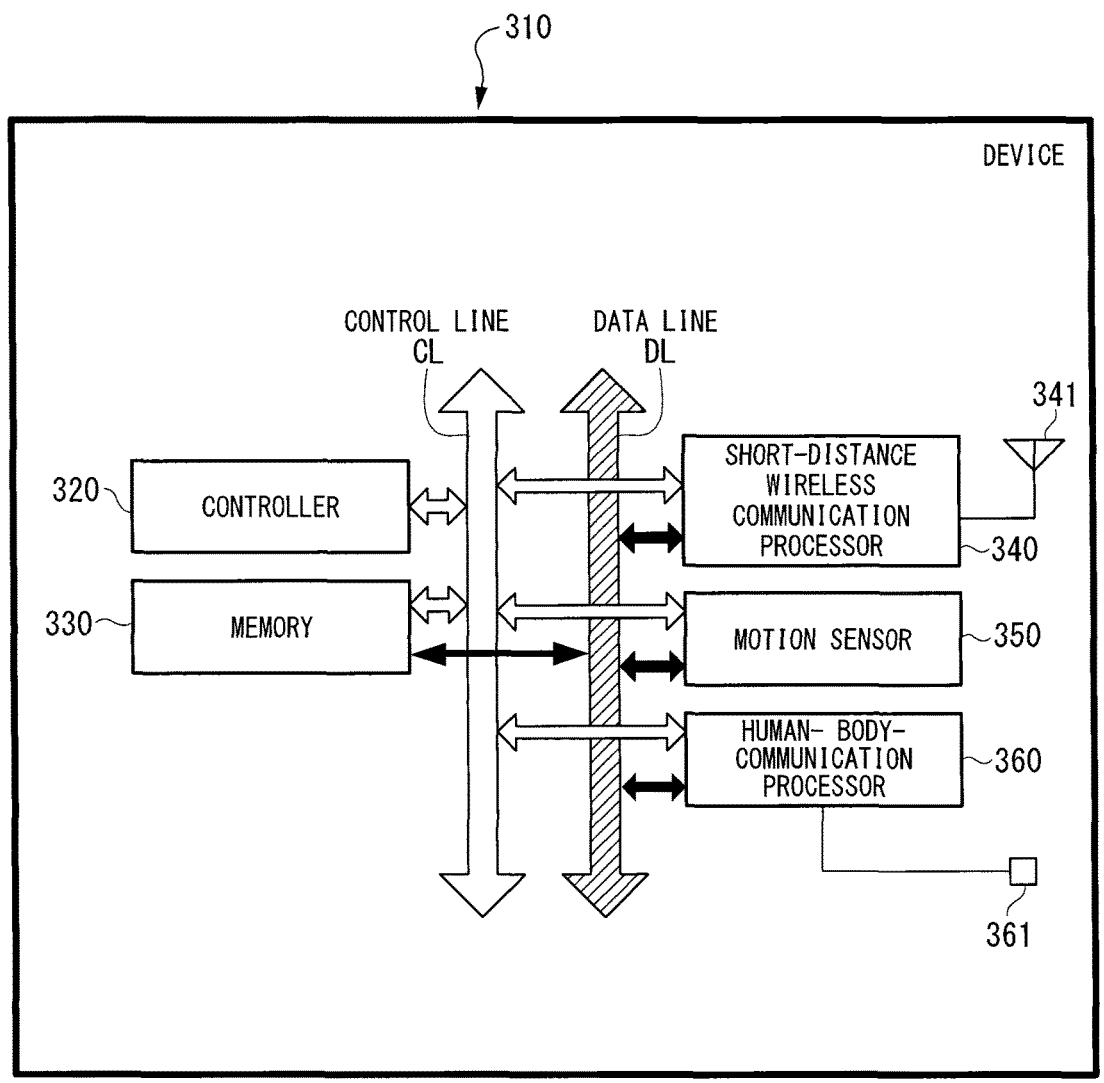
FIG. 3 shows a schematic diagram of an implementation of wearable-device-communication terminal.

FIG. 3 shows a schematic diagram of the structure of a wearable-device-communication terminal 310 that is contained in the battery-powered device 300. The wearable-device-communication terminal 310 shown in FIG. 3 is also an example of wearable-device-communication terminals that are incorporated in devices other than the battery-powered device, such as a key, an electronic device with a rotary switch, or a card key. In one implementation, the wearable-device-communication terminal 310 includes a circuit board configured with components such as an integrated circuit (IC) chip. Although FIG. 3 shows a schematic structure of the wearable-device-communication terminal 310 that is included in the battery-powered device 300, a similarly structured wearable-device-communication terminal 410 can be included in the key 400, and other similarly structured wearable-device-communication terminals can be included in other devices configured to communicate with the wearable device 100.

In one implementation, the wearable-device-communication terminal 310 includes a controller 320 and a memory 330. The controller 320 controls each part of the wearable-device-communication terminal 310. For example, the memory 330 stores ae program that is run by the controller 320. Further, an ID can also be stored in the memory 330 and the ID can be retrieved from memory 330 and used by the controller 320.

Additionally, the wearable-device-communication terminal 310 can include a short-distance wireless communication processor 340 and a corresponding short-distance wireless antenna 341. In one implementation, the short-distance wireless communication processor 340 is a communication processing part that performs wireless communications by IEEE 802.11 standard. In one implementation, the short-distance wireless communication process part 340 that performs wireless communications using the IEEE 802.11 standard performs wireless communications using wireless signals having a frequency of 2.4 GHz or 5 GHz. The antenna 341 is electrically connected to the short-distance wireless communication process part 340. Further, the short-distance wireless communication processor 340 can be equipped with the function to perform near field communication using Bluetooth®.

In one implementation, the wearable-device-communication terminal 310 can include a motion sensor 350 to detect a motion of the wearable device 100. The motion sensor 350 can include, for example, one or more acceleration sensors detecting acceleration and one or more gyroscopic sensor detecting angular velocity.

The wearable-device-communication terminal 310 can further include a human-body-communication processor 360 that interactively communicates with the wearable device 100, for example, by using the human body as a transmission line, where the electrode 361 electrically contacts the human body to transmit electrical signals through the body. For example, electric signals can be coupled into a conducting layer in the human body using galvanic or capacitive coupling. In one implementation, the communication performed by the human-body-communication processor 360 is performed using either an electric field system or an electric current system.

Additionally, the wearable-device-communication terminal 310 can be equipped with a control line CL and a data line DL that each respectively function as internal bus lines.

Figure 4:
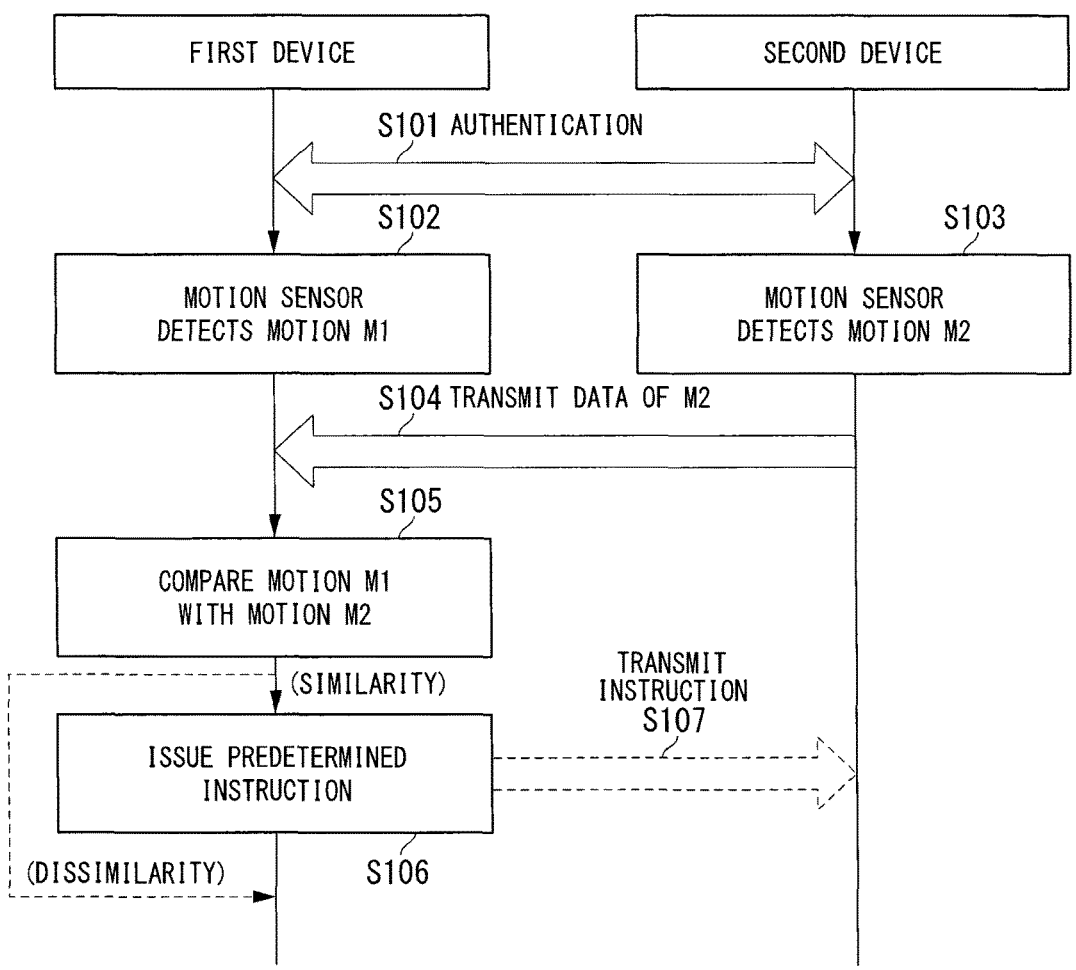
FIG. 4 shows a sequence diagram of an implementation of process of authenticating, comparing motion, and transmitting an instruction between a first and a second device.

FIG. 4 shows a sequence diagram for a method of communication between two devices using, for example, human-body communication and comparing the motions of the two terminals. In step S101, a first device, such as the wearable device 100 shown in FIG. 1, establishes human-body communication with a second device, such as the portable electronic device 200, the battery-powered device 300, or the key 400 shown in FIG. 1. In one implementation, the first device and the second device perform a process in which the devices each detects/inquiries regarding the presence of the other device by, for example, by detecting a human-body communication signal or by sending an probe signal (e.g., pinging the other device) using human-body communication and waiting for a response. In one implementation, after the inquiring devices sends the probe signal and the probe signal is detected by the other device, then an authentication process is performed between the first and second devices using human-body communication. By this authentication process, each device gathers information regarding the type and identity of the other device. In step S102, after completion of the authentication process, the first device detects the motion M1 when the first device is moved/shaken.

In step S103, after completion of the authentication process, the second device detects the motion M2 when the second device is moved/shaken. The respective motions M1 and M2 are detected using the motion sensors of the corresponding device. For example, the motion M1 can be detected using accelerometers and/or gyroscopes of the first device.

In step S104, the second device signals data representing the motion M2 to the first device, and the first device receives the data representing the motion M2 information from the second device.

In step S105, the first device next compares the data for motion M2 received from the second device with the data representing motion M1 that was measured by the first device. In one implementation, the two motions are compared using measured time data (e.g., time stamps) such that the two motions are compared using the same time-axis. If the two motions are determined to be similar, then the process continues to step S106. Otherwise, the motions are determined to be dissimilar and step S106 is not performed at this time.

In step S106, after determining that motion M1 is similar to motion M2, the first device issues a predetermined instruction, which is transmitted to the second device in step S107. In one implementation, when the first device issues a predetermined instruction, the instruction is performed by the first device, and the first device performs an operation based on this instruction.

In step S107, the instruction is transmitted from the first device to the second device. In one implementation, this instruction is transmitted from the first device to the second device using the human-body-communication functionality of the two devices. The second device receives the instruction and performs a corresponding operation based on the instruction.

When motion M1 is not similar to motion M2 as determined by the comparison performed in step S105, then the first device does not issue the predetermined instruction and does not transmit a corresponding instruction to the second device. Further, when motion M1 is determined to be not similar to motion M2, then the devices continue to measure the respective motions M1 and M2 and compare the motions as indicated in steps S101-S105 until similar motions are detected.

In one implementation, motion M1 is compared to motion M2 by determining the correlation between the shapes of the two motions. When the correlation is determined to be significant, for example due to the correlation having a value that is above a predefined threshold, then the two motions are determined to be similar. The correlation function can have a large value even though the functions corresponding to the motions M1 and M2 are offset with respect to one another along the time axis (e.g., the correlation function can be used to determine that the motions M1 and M2 are similar despite a relative offset between the clocks of the two devices or other aspects of the motion measurements resulting in a lag between the measured motions M1 and M2 such as the user shaking the devices simultaneously but having a limp wrist resulting in motion M2 of the hand lagging motion M1 of the forearm).

In another implementation, the clocks between the two devices are synchronized, and the motion M1 is compared to motion M2 to determine whether the two motions are synchronized. For example, when the acceleration exhibited by the data of motion M1 increases and decreases at the same times that the acceleration exhibited by the data of motion M2 increases and decreases, then the motions are determined to be synchronized. When the two motions are determined to be synchronized, then the first device performs step S106 and the first and second devices perform step S107. Otherwise, steps S106 and S107 are not performed at this time and the devices continue/repeat the steps S102-S105, as in the case where similarity between motions M1 and M2 is used as the criterion for performing steps S106 and S107.

Figure 5:
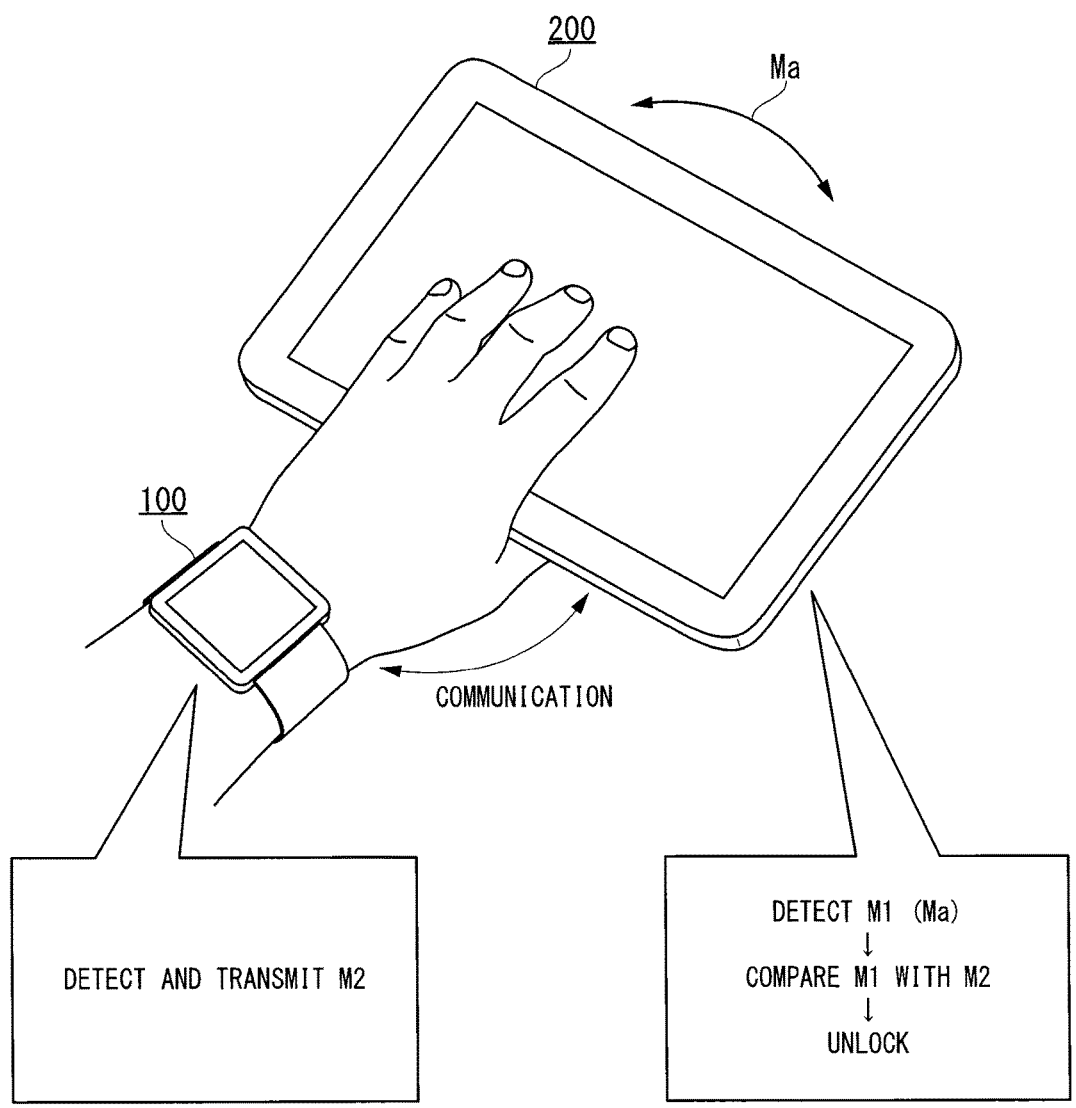
FIG. 5 shows a drawing of an implementation a process of comparing motions between a wearable device and a portable electronic device to unlock the portable electronic device.

FIG. 5 shows an example of two devices using human-body communication and comparing the motions to perform a predefined instruction when the motions are similar/synchronized, according to the method shown in FIG. 4. In FIG. 5 the first device is a portable electronic device 200 (e.g., a smartphone) and the second device is a wearable device 100. As shown in FIG. 5, the user wears on their wrist the wearable device 100 and grasps the portable electronic device 200 in their hand. The electrode 191 of the wearable device 100 contacts the user or is in close proximity to the user, and an electrode of the portable electronic device 200 that is similar to electrode 361 of the wearable-device-communication terminal 310 contacts the user or is in close proximity to the user. When this occurs, human-body communication is initiated between the wearable device 100 and the portable electronic device 200. Further, the user performs a movement operation such as shaking both devices back and forth, as shown by arrow Ma. At this time, the portable electronic device 200 detects the motion M1, which is generated by the motion indicated by arrow Ma. Also at this time, the wearable device 100 detects the motion M2, which is also generated by the motion indicated by arrow Ma. Data representing the motion M2 measured by the motion sensor 180 of the wearable device 100 is transmitted using human-body communication from the wearable device 100 to the portable electronic device 200, where the data is received. The portable electronic device 200 then compares the data of motion M2 with data corresponding motion M1 and determines whether the two motions are similar (or in certain implementations the two motions are synchronized). When the two motions are determined to be similar (or in certain implementations the two motions are synchronized), the portable electronic device 200 unlocks. In the unlocked state, the portable electronic device 200 can be used, for example, to run applications and perform conventional operations of the portable electronic device 200 according to inputs from the user.

Figure 6:
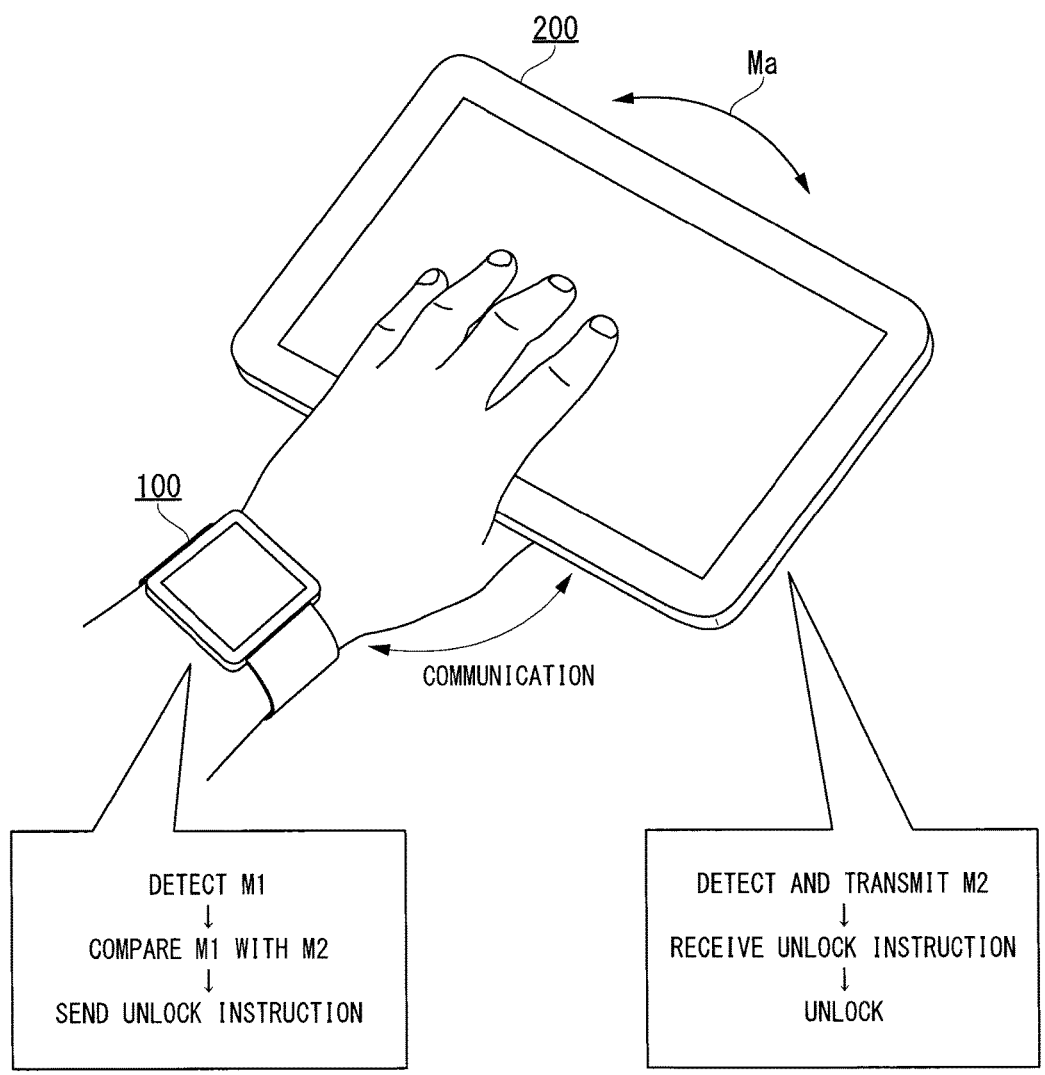
FIG. 6 shows a drawing of another implementation a process of comparing motions between a wearable device and a portable electronic device to unlock the portable electronic device.

FIG. 6 shows an example of two devices using human-body communication and comparing the motions to perform a predefined instruction, when the motions are similar/synchronized, according to the method shown in FIG. 4. In FIG. 6 the first device is a wearable device 100 and the second device is a portable electronic device 200 (e.g., a smartphone). As shown in FIG. 6, the user wears on their wrist the wearable device 100 and grasps the portable electronic device 200 in their hand. The electrode 191 of the wearable device 100 contacts the user or is in close proximity to the user, and an electrode of the portable electronic device 200 that is similar to electrode 361 of the wearable-device-communication terminal 310 contacts the user or is in close proximity to the user. When this occurs, human-body communication is initiated between the wearable device 100 and the portable electronic device 200. Further, the user performs a movement operation such as shaking both devices to the right and left, as shown by arrow Ma. At this time, the portable electronic device 200 detects the motion M2, which is generated by the motion indicated by arrow Ma. The motion M2 is detected using a motion sensor of the portable electronic device 200 that is similar to the motion sensor 350 of the wearable-device-communication terminal 310. Also at this time, the wearable device 100 detects the motion M1, which is also generated by the motion indicated by arrow Ma. Data representing the motion M2 that is measured by the motion sensor of the portable electronic device 200 is transmitted using human-body communication from the portable electronic device 200 to the wearable device 100, where the data is received. The wearable device 100 then compares the received data of motion M2 with data corresponding motion M1 and determines whether the two motions are similar or in alternative implementations whether the motion are synchronized. When the two motions are determined to be similar or in alternative implementations synchronized, the wearable device 100 transmits an unlock instruction to the portable electronic device 200. The portable electronic device 200 receives the unlock instruction and unlocks. The wearable device 100 then terminates the unlock instruction. In the unlocked state the portable electronic device 200 can be used, for example, to run applications and perform conventional operations of the portable electronic device 200 according to inputs from the user.

Figure 7:
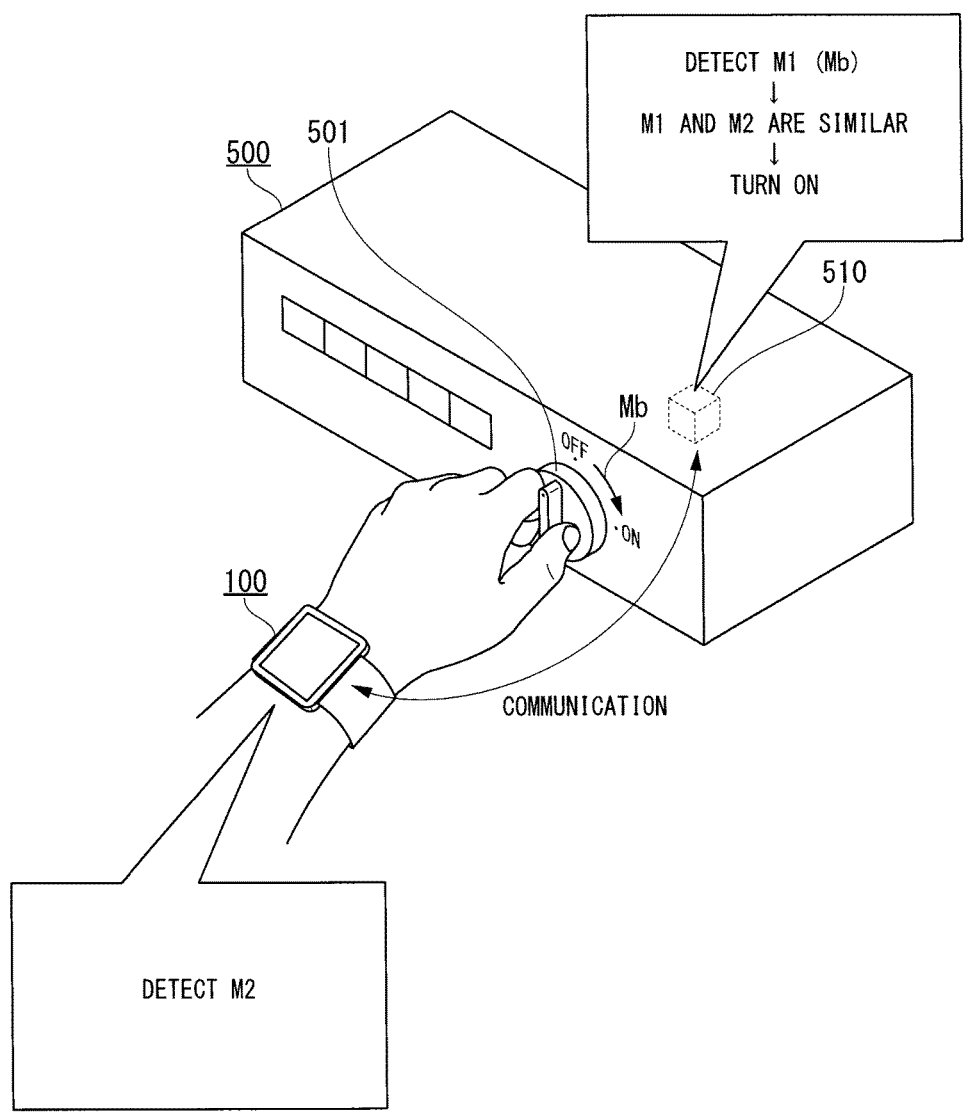
FIG. 7 shows a drawing of an implementation a process of comparing motions between a wearable device and an electronic device having a rotary ON/OFF switch to turn on the electronic device.

FIG. 7 shows an example of two devices using human-body communication and comparing the respective motions of the two devices to perform a predefined instruction, when the motions are similar/synchronized, according to the method shown in FIG. 4. In FIG. 7 the first device is an electronic device 500 having a rotary switch 501 and a wearable-device-communication terminal 510 that is similar to the wearable-device-communication terminal 310 shown in FIG. 3. The second device is a wearable device 100. As shown in FIG. 7, the user wears on their wrist the wearable device 100 and grasps the rotary switch 501 in their hand. The electrode 191 of the wearable device 100 contacts the user or is in close proximity to the user, and an electrode of the rotary switch 501 that is similar to electrode 361 of the wearable-device-communication terminal 310 contacts the user or is in close proximity to the user. When this occurs, human-body communication is initiated between the wearable device 100 and the electronic device 500.

Further, the user performs a movement operation such as rotating the rotary switch 501, as shown by arrow Mb, to turn the electronic device 500 to an ON state from initially being in an OFF state. At this time, the electronic device 500 detects the motion M1, which is generated by the motion indicated by the arrow Mb. The motion M1 is detected using a motion sensor of the electronic device 500 that is similar to the motion sensor 350 of the wearable-device-communication terminal 310. Also at this time, the wearable device 100 detects the motion M2, which is also generated by the motion indicated by arrow Mb. Data representing the motion M2 that is measured by the motion sensor of the wearable device 100 is transmitted using human-body communication from the wearable device 100 to the electronic device 500, where the data is received. The wearable-device-communication terminal 510 then compares the received data of motion M2 with data corresponding motion M1 and determines whether the two motions are similar or synchronized. When the two motions are determined to be similar or synchronized, the wearable-device-communication terminal 510 signals permission to the electronic device 500 to turn on. In response to the permission signal from the wearable-device-communication terminal 510, the electronic device 500 is turned on.

Figure 8:
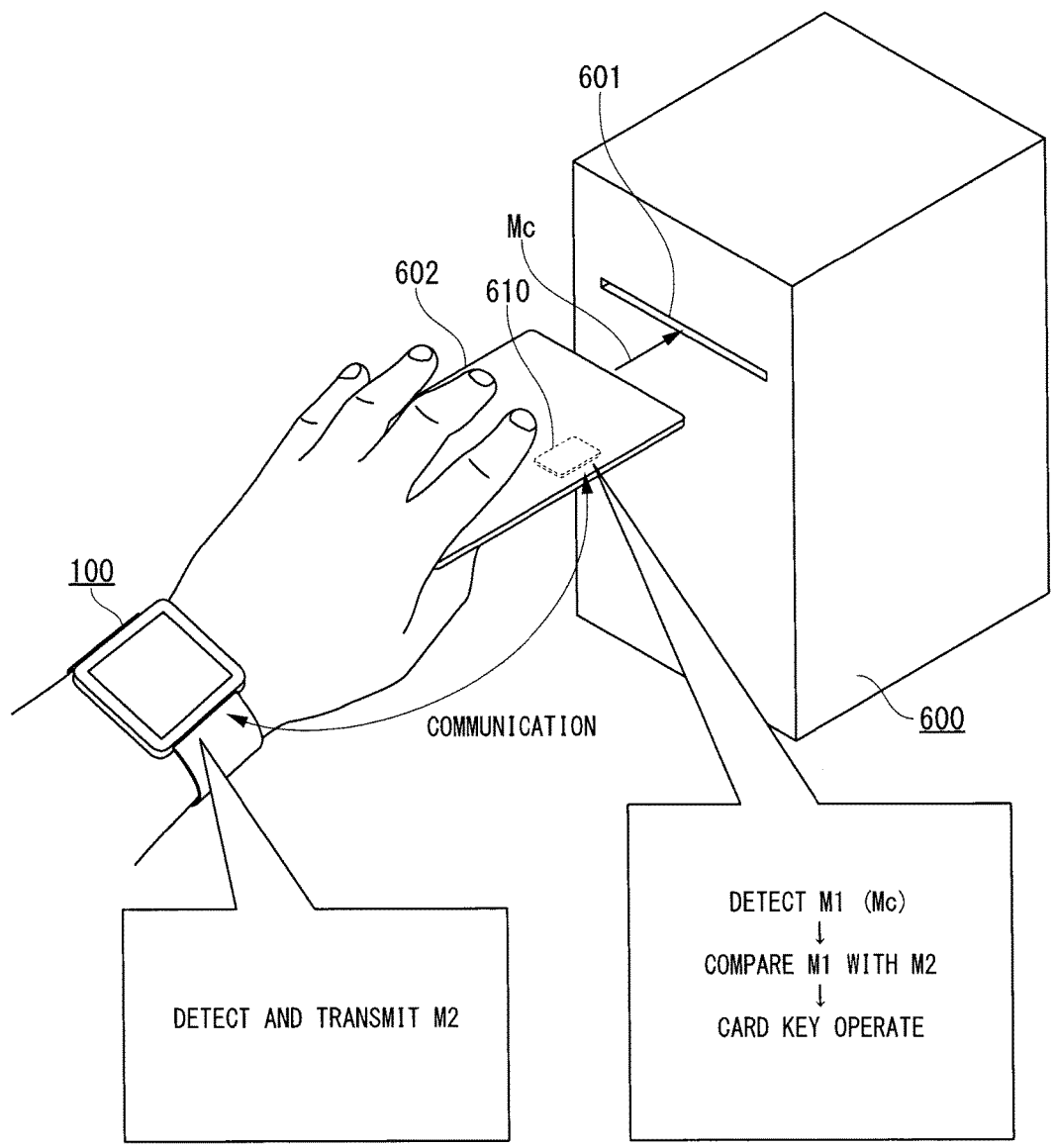
FIG. 8 shows a drawing of an implementation a process of comparing motions between a wearable device and an card key to enable operation of the card.

FIG. 8 shows another example of two devices using human-body communication and comparing the respective motions of the two devices to perform a predefined instruction, when the motions are similar/synchronized, according to the method shown in FIG. 4. In FIG. 8 the first device is a card key 602 having a wearable-device-communication terminal 610 that is similar to the wearable-device-communication terminal 310 shown in FIG. 3, and the second device is a wearable device 100. The card key 602 is configured to be inserted into a personal-computer device 600 having a card slot 601, and the card key 602 is inserted using the motion Mc. By inserting the card key 602 into the card slot 601, the information recorded on the card key 602 can be accessed by the personal-computer device 600, and the personal-computer device 600 can perform a specific function such as running a program stored on the card key 602. Here, for example, the stored information is read only when a specific user puts the card key 602 into the card slot 601. That is, when the user wearing the wearable terminal 100 puts the card key 602 in the card slot, then the stored information is read from the card key 602 to the personal-computer device 600.

As shown in FIG. 8, the user wears on their wrist the wearable device 100 and grasps the card key 602 in their hand. The electrode 191 of the wearable device 100 contacts the user or is in close proximity to the user, and an electrode of the wearable-device-communication terminal 610 that is similar to electrode 361 of the wearable-device-communication terminal 310 contacts the user or is in close proximity to the user. When this occurs, human-body communication is initiated between the wearable device 100 and the wearable-device-communication terminal 610 of the card key 602. Further, the user performs a movement operation of inserting the card key 602 in the key slot 601, as shown by arrow Mb. At this time, the wearable-device-communication terminal 610 detects the motion M1, which is generated by the motion indicated by arrow Mc. The motion M1 is detected using a motion sensor of the wearable-device-communication terminal 610 that is similar to the motion sensor 350 of the wearable-device-communication terminal 310. Also at this time, the wearable device 100 detects the motion M2, which is also generated by the motion indicated by arrow Mc. Data representing the motion M2 measured by the motion sensor of the wearable device 100 is transmitted using human-body communication from the wearable device 100 to the wearable-device-communication terminal 610, where the data is received. The wearable-device-communication terminal 610 then compares the received data of motion M2 with data corresponding motion M1 and determines whether the two motions are similar (or alternatively synchronized). When the two motions are determined to be similar (or alternatively synchronized), the wearable-device-communication terminal 610 signals permission to the card key 602 to initiate communications and to output information to the personal-computer device 600. After the permission signal is issued, the personal-computer device 600 can read the information stored by the card key 602.

Figure 9:
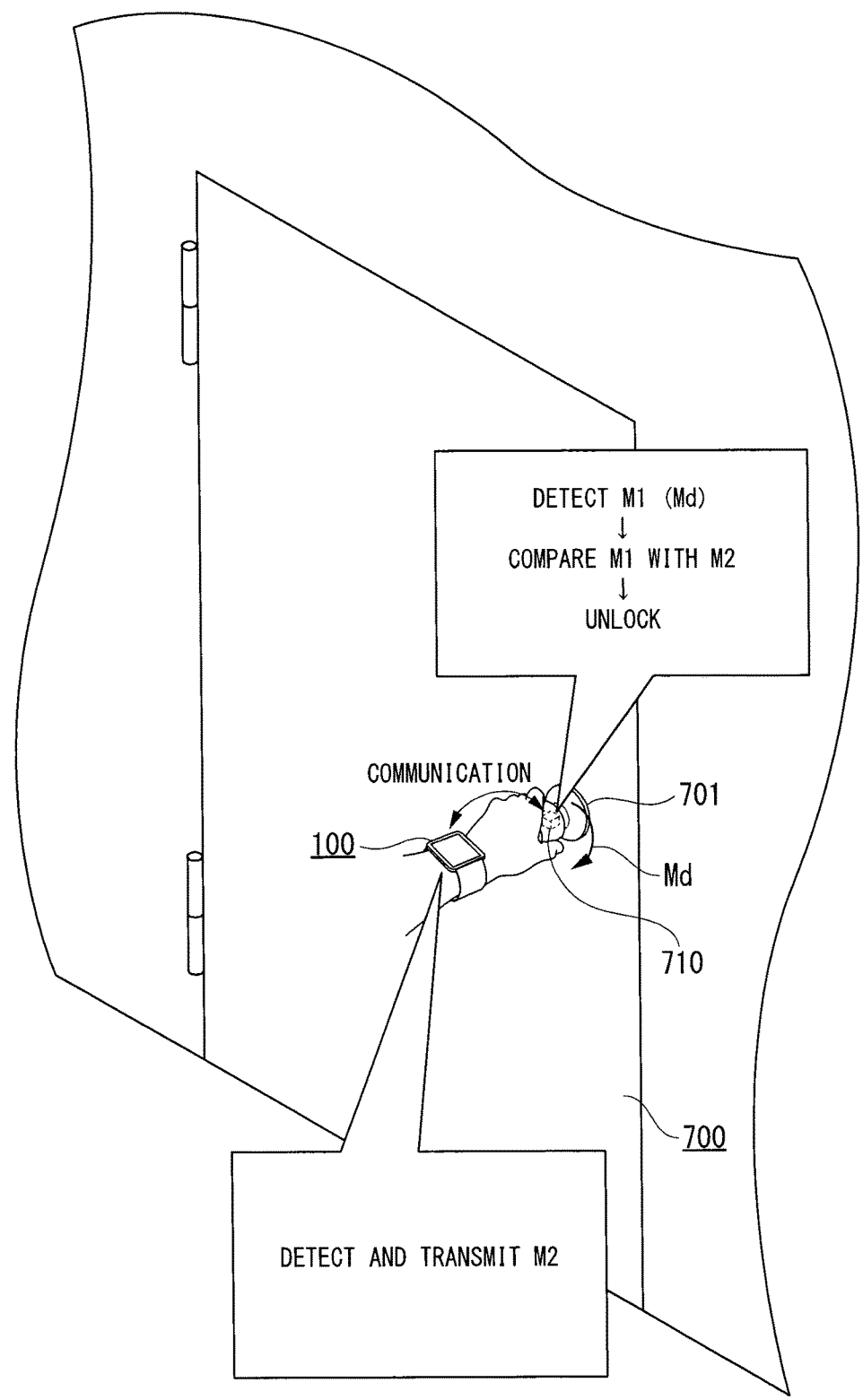
FIG. 9 shows a drawing of an implementation a process of comparing motions between a wearable device and a knob of a door to release a lock on the door.

FIG. 9 shows another example of two devices using human-body communication and comparing the respective motions of the two devices to perform a predefined instruction, when the motions are similar/synchronized, according to the method shown in FIG. 4. In FIG. 9 the first device is a door 700 having a knob 701 that includes a wearable-device-communication terminal 710 that is similar to the wearable-device-communication terminal 310 shown in FIG. 3. The second device is a wearable device 100. The knob 701 is equipped with a mechanism that locks the door 700 (i.e., a lock). In one implementation, the knob 701 releases the lock of the door 700, when a user wearing the wearable device 100 turns the knob 701. As shown in FIG. 9, the user wears on their wrist the wearable device 100 and grasps the knob 701 in their hand. The electrode 191 of the wearable device 100 contacts the user or is in close proximity to the user, and an electrode of the wearable-device-communication terminal 710 contacts the user or is in close proximity to the user. When this occurs, human-body communication is initiated between the wearable device 100 and the door 700. Further, the user performs a movement operation such as rotating the knob 701, as shown by arrow Md. At this time, the wearable-device-communication terminal 710 detects the motion M1, which is generated by the motion indicated by arrow Md. The motion M1 is detected using a motion sensor of the wearable-device-communication terminal 710. Also at this time, the wearable device 100 detects the motion M2, which is also generated by the motion indicated by arrow Md. Data representing the motion M2 that is measured by the motion sensor of the wearable device 100 is transmitted using human-body communication from the wearable device 100 to the wearable-device-communication terminal 710, where the data is received. The wearable-device-communication terminal 710 then compares the received data of motion M2 with data corresponding motion M1 and determines whether the two motions are similar (synchronized). When the two motions are determined to be similar (synchronized), the wearable-device-communication terminal 710 signals to the knob 701 to release the lock permitting the door 700 to open. In response to the permission signal from the wearable-device-communication terminal 710, the lock is released and the user who turned the knob 701 can open the door 700.

Figure 10:
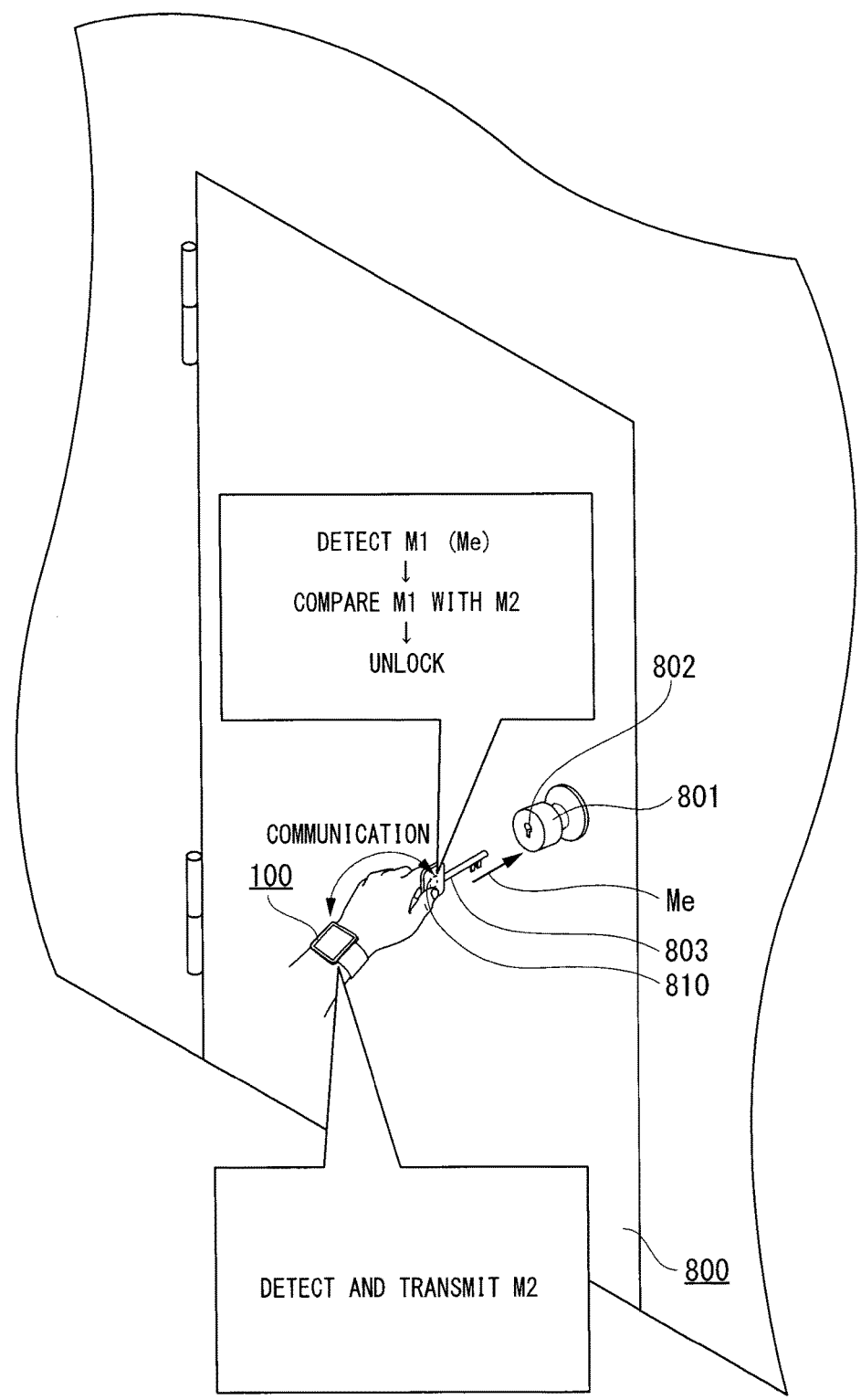
FIG. 10 shows a drawing of an implementation a process of comparing motions between a wearable device and a key of a door to release a lock on the door.

FIG. 10 shows another example of two devices using human-body communication and comparing the respective motions of the two devices to perform a predefined instruction, when the motions are similar/synchronized, according to the method shown in FIG. 4. In FIG. 10 the first device is a key 803 having a wearable-device-communication terminal 810, and the second device is a wearable device 100. The key 803 is configured to be inserted into a key hole 802 of a knob 801, and the knob 801 is configured in a door 800. The knob 801 is equipped with the mechanism that locks the door 800. In one implementation, the knob 801 releases the lock of the door 800 when a user wearing the wearable device 100 performs a predefined motion. For example, in one implementation, the knob 801 releases the lock of the door 800 when the user wearing the wearable device 100 inserts the key 803 into the key hole 802.

As shown in FIG. 10, the user wears on their wrist the wearable device 100 and grasps the key 803 in their hand. The electrode 191 of the wearable device 100 contacts the user, and an electrode of the wearable-device-communication terminal 810 contacts the user. When this occurs, human-body communication is initiated between the wearable device 100 and the wearable-device-communication terminal 810 of the key 803. Further, the user performs a motion of inserting the key 803 into the key hole 802, as shown by arrow Me. At this time, the wearable-device-communication terminal 810 detects the motion M1, which is generated by the motion indicated by arrow Me. The motion M1 is detected using a motion sensor of the wearable-device-communication terminal 810. Also at this time, the wearable device 100 detects the motion M2, which is also generated by the motion indicated by arrow Me. Data representing the motion M2 that is measured by the motion sensor of the wearable device 100 is transmitted using human-body communication from the wearable device 100 to the wearable-device-communication terminal 810, where the data is received. The wearable-device-communication terminal 810 then compares the received data of motion M2 with data corresponding motion M1 and determines whether the two motions are similar (synchronized). When the two motions are determined to be similar (synchronized), the wearable-device-communication terminal 810 signals permission to release the lock so that the door 800 can be opened. In response to the signal from the lock of the door 800 is released and the door 800 can be opened.

Figure 11:
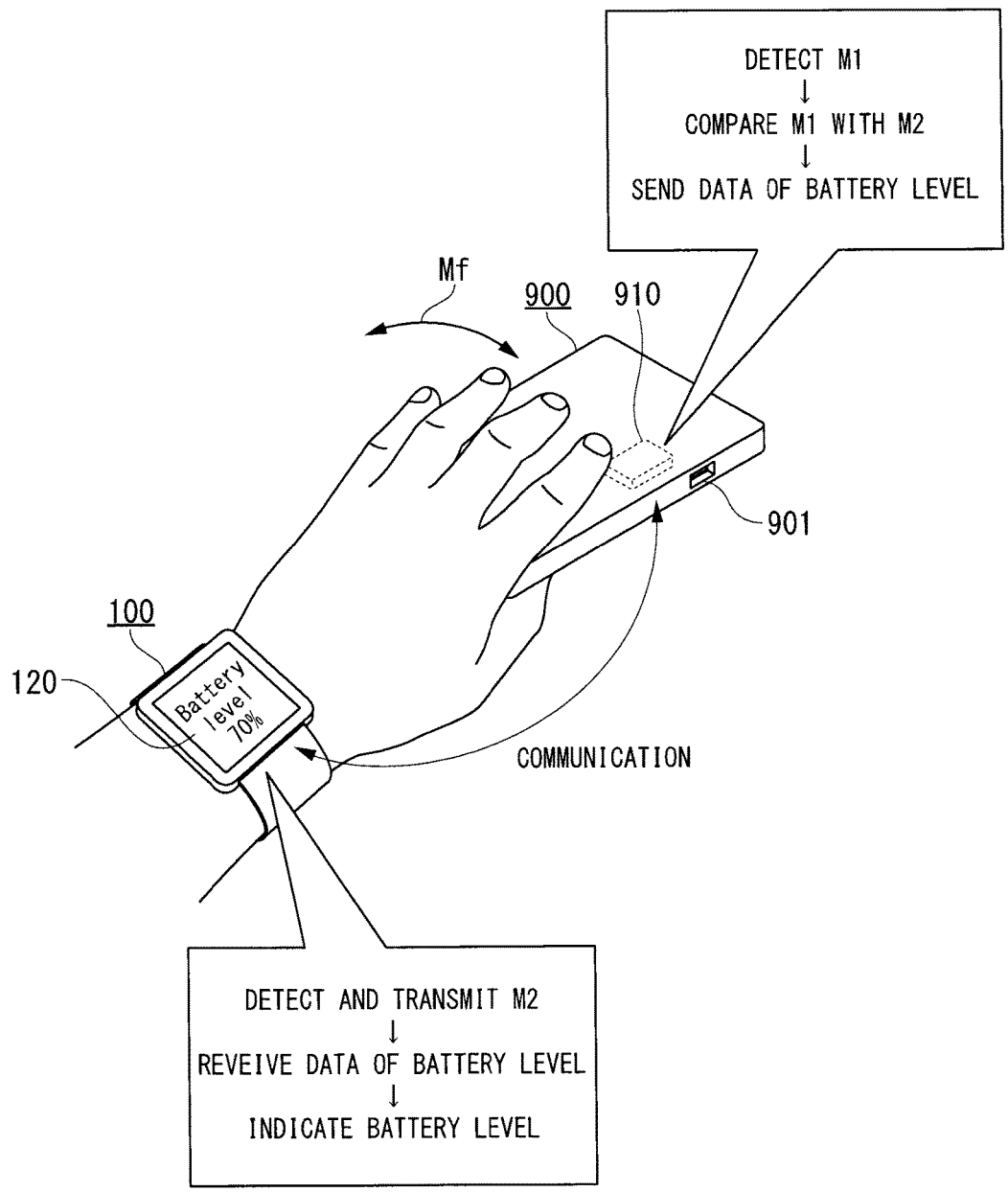
FIG. 11 shows a drawing of an implementation a process of comparing motions between a wearable device and a battery-powered device to readout the residual charge of a battery.

FIG. 11 shows an example of two devices using human-body communication and a comparison of their respective motions to perform a predefined instruction when the motions are similar/synchronized. In FIG. 11 the first device is a battery-powered device 900 having a charging connection 901 and a wearable-device-communication terminal 910. The second device is a wearable device 100.

As shown in FIG. 11, the user wears on their wrist the wearable device 100 and grasps the battery-powered device 900 in their hand. The electrode 191 of the wearable device 100 contacts the user, and an electrode of the wearable-device-communication terminal 810 contacts the user. When this occurs, human-body communication is initiated between the wearable device 100 and the wearable-device-communication terminal 910 of the battery-powered device 900. Further, the user performs a movement operation of shaking the battery-powered device 900, as shown by arrow Mf. At this time, the wearable-device-communication terminal 910 detects the motion M1, which is generated by the motion indicated by arrow Mf. The motion M1 is detected using a motion sensor of the wearable-device-communication terminal 910. Also at this time, the wearable device 100 detects the motion M2, which is also generated by the motion indicated by arrow Mf. Data representing the motion M2 that is measured by the motion sensor of the wearable device 100 is transmitted using human-body communication from the wearable device 100 to the wearable-device-communication terminal 910, where the data is received. The wearable-device-communication terminal 810 then compares the received data of motion M2 with data corresponding motion M1 and determines whether the two motions are similar (or alternatively synchronized). When the two motions are determined to be similar (or alternatively synchronized), the wearable-device-communication terminal 910 signals information of the residual charge of a battery cell powering the battery-powered device 900 to the wearable terminal 100. In one implementation, the information of the residual battery charge is sent to the wearable terminal 100 using human-body communication. When the wearable device 100 receives the information of the residual battery charge, the wearable device 100 displays, on the display 120, information representing the residual battery charge.

Figure 12:
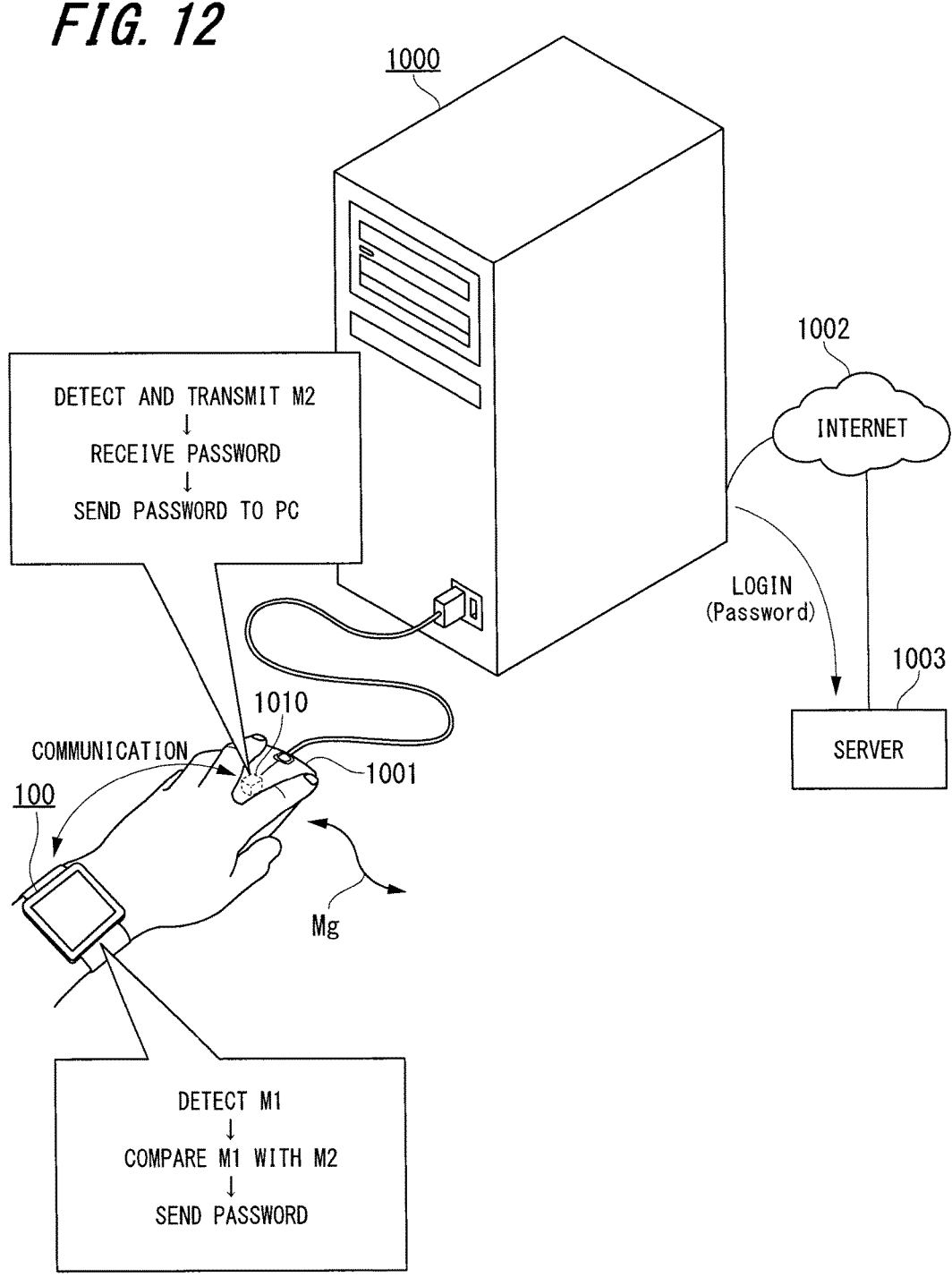
FIG. 12 shows a drawing of an implementation a process of comparing motions between a wearable device and a mouse device to transmit a stored password from the mouse device to a personal-computer device.

FIG. 12 shows another example of two devices using human-body communication and a comparison between the respective motions of the two devices, and if the motions are similar/synchronized, then performing a predefined instruction, according to the method shown in FIG. 4. In FIG. 12 the first device is a wearable device 100, and the second device is mouse device 1001 having a wearable-device-communication terminal 1010. The mouse device 1001 is configured to connect to a personal-computer device 1000 that is connected to a server 1003 via the internet 1002. The wearable-device-communication terminal 1010 is configured to receive and store in memory a password, and also to provide the password to the personal-computer device 1000 after receiving a predefined instruction. The personal-computer device 1000 is configured to access the server 1003 through the internet 1002, and to relay the password to the server 1003. In one implementation, the personal-computer device 1000 receives authorization to log the user onto service provided by the server 1003 by transmitting the password to the server 1003 and receiving logon authorization from the server 1003. When the personal-computer device 1000 receives authorization, then the user can log the user onto the service which a server 1003 provides.

As shown in FIG. 12, the user wears on their wrist the wearable device 100 and grasps the mouse device 1001 by the hand. The electrode 191 of the wearable device 100 contacts the user, and an electrode of the wearable-device-communication terminal 1010 contacts the user. When this occurs, human-body communication is initiated between the wearable device 100 and the wearable-device-communication terminal 1010 of the mouse device 1001. Further, the user moves the mouse device 1001 with a movement operation, as shown by arrow Mg. At this time, the wearable-device-communication terminal 1010 detects the motion M2, which is generated by the motion indicated by arrow Mg. The motion M2 is detected using a motion sensor of the wearable-device-communication terminal 1010. Also at this time, the wearable device 100 detects the motion M1, which is also generated by the motion indicated by arrow Mg. Data representing the motion M2 that is measured by the motion sensor of the wearable-device-communication terminal 1010 is transmitted using human-body communication from the wearable-device-communication terminal 1010 to the wearable device 100, where the data is received. The wearable device 100 then compares the received data of motion M2 with data corresponding motion M1 and determines whether the two motions are similar (or alternatively synchronized). When the two motions are determined to be similar (or alternatively synchronized), the wearable device 100 signals, using human-body communication, a password to the wearable-device-communication terminal 1010. The wearable-device-communication terminal 1010 receives the password and then relays the password to the Personal-computer device 1000. Next, the personal-computer device 1000 relays the password to the server 1003. After the password is received by the server, the user is logged into the server and can access those services which a server 1003 provides in accordance with the password received by the server 1003.

Figure 13:
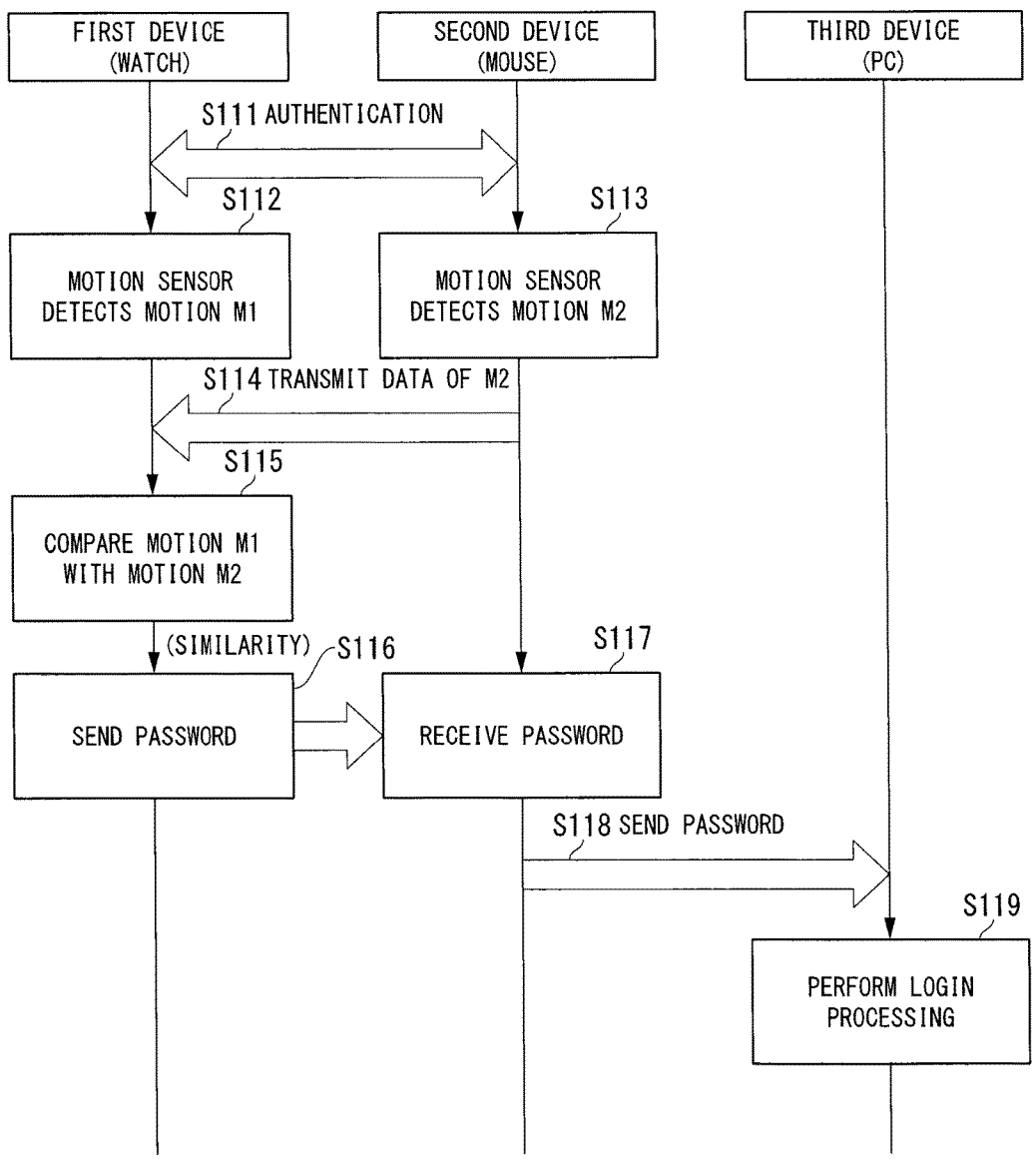
FIG. 13 shows a sequence diagram of an implementation of process of authenticating, comparing motion, and transmitting a password between a first and a second device.

FIG. 13 shows a sequence diagram for a method of communication between two devices using, for example, human-body communication and comparing the motions of the two devices. In one implementation, the first device can be a wearable device 100, such as the wearable device 100 shown in FIG. 12. The second device can be a mouse, such as the mouse device 1001 shown in FIG. 12. The third device can be a personal-computer device, such as the personal-computer device 1000 shown in FIG. 12, for example.

In step S111, the first device establishes human-body communication with the second device. In one implementation, the first device and the second device perform a process in which the devices each detects/inquiries regarding the presence of the other device by, e.g., detecting a human-body communication signal from the counterpart device or by sending an probe signal (e.g., by pinging the counterpart device) using human-body communication and waiting for a response. In one implementation, after one of the first and second devices sends the probe signal and the probe signal is detected by the counterpart device, and then an authentication process is performed between the first and second devices using human-body communication. By this authentication process, each device gathers information regarding the type and identity of the other device.

In step S112, after completion of the authentication process, the first device detects the motion M1 when the first device is moved.

In step S113, after completion of the authentication process, the second device detects the motion M2 when the second device is moved. The respective motions M1 and M2 are detected using the motion sensors of the corresponding device. For example, the motions M1 and M2 can be detected using accelerometers and/or gyroscopes.

In step S114, the second device signals to the first device data representing the motion M2, and the first device receives the data representing the motion M2 information.

In step S115, the first device compares the data representing the motion M2 received from the second device with the data representing the motion M1 measured by the first device. In one implementation, the two motions are compared using timing data, such as time stamps, to compare the two motions by using a single common time-axis (i.e., the same time-axis is used from both motions M1 and M2). If the two motions are determined to be similar, then the process continues to step S116. Otherwise, the motions are determined to be dissimilar and process repeats steps S111-S115 until similar/synchronized motions are detected. In one implementation in which the first device is wearable device 100 and the second device is the mouse device 1001, in step S116 after the motion M1 and the motion M2 are determined to be similar, the wearable device 100 transmits a predetermined password stored by the memory 150. The password is communicated to the mouse device 1001 using human-body communication, for example.

In step S117, the second device receives the password transmitted during step S116. In step S118, the second device transmits to the third device the password received during step S117.

In step S119, the third device receives the password transmitted during step S118 by the second device. The third device, e.g., the personal-computer device 1000, uses the password transmitted during step S118 to perform a process that logs the user onto services provided by the server 1003.

Figure 14:
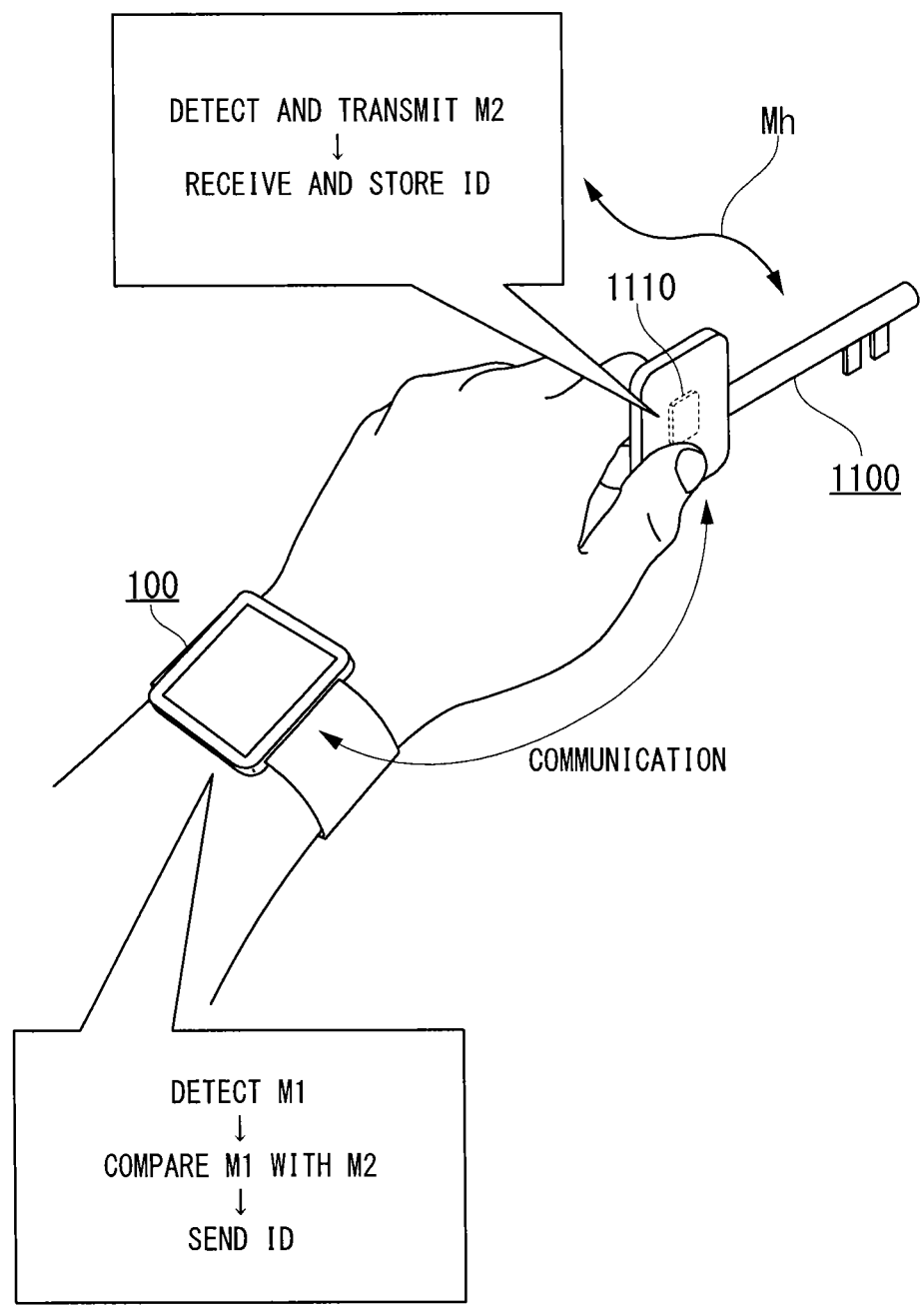
FIG. 14 shows a drawing of an implementation a process of comparing motions between a wearable device and a key to transmit and store a password from the wearable device to the key.

FIG. 14 shows another example of two devices using human-body communication and a comparison between the respective motions of the two devices. If the motions are determined to be similar/synchronized, then the two devices perform a predefined instruction. In FIG. 14 the first device is a wearable device 100, and the second device is a key 1100 having a wearable-device-communication terminal 1110. The key 1100 is configured to be inserted into a key hole, and the wearable-device-communication terminal 1110 of the key 1100 stores in memory an identification code (ID) that identifies the user. In one implementation, the ID code stored in the wearable-device-communication terminal 1110 is confirmed by a target device when the key 1100 is inserted in the key hole of the target device.

As shown in FIG. 14, the user wears on their wrist the wearable device 100 and grasps the key 1100 in their hand. The electrode 191 of the wearable device 100 contacts the user, and an electrode of the wearable-device-communication terminal 1110 contacts the user. When this occurs, human-body communication is initiated between the wearable device 100 and the wearable-device-communication terminal 1110 of the key 1100. Further, the user moves the key 1100 with a movement operation, as shown by arrow Mh. At this time, the wearable-device-communication terminal 1110 detects the motion M2, which is generated by the motion indicated by arrow Mh. The motion M2 is detected using a motion sensor of the wearable-device-communication terminal 1110. Also at this time, the wearable device 100 detects the motion M1, which is also generated by the motion indicated by arrow Mh. Data representing the motion M2 that is measured by the motion sensor of the wearable-device-communication terminal 1110 is transmitted, using human-body communication, from the wearable-device-communication terminal 1110 to the wearable device 100, where the data is received. The wearable device 100 then compares the received data of motion M2 with data corresponding motion M1 and determines whether the two motions are similar (or alternatively synchronized). When the two motions are determined to be similar (or alternatively synchronized) the wearable device 100 sends an ID code to the wearable-device-communication terminal 1110. For example, the wearable terminal 100 reads the ID code stored in the memory 150 and transmits the ID code to a terminal 1110 using human-body communication. The wearable-device-communication terminal 1110 receives the ID code and stores the ID code in memory, such that the key 1100 can later retrieve the ID code and relay the ID code to a target device if the key 1100 is inserted in the key hole of the target device.

The target device can therefore identify the user of the key 1100 by the ID code from the wearable-device-communication terminal 1110 of the key 1100. Additionally, the target device can determine whether the user is authorized to access the target device, and the target device can issue an instruction giving permission to release a lock of the target device in accordance with the determination of authorization for the user corresponding to the ID code to use the target device. For example, a key 1100 having the above-identified functionality would be applicable for a rental car. By applying the above-identified functionality to the key of the rental car, the user of the rental car can be identified and the authorization to access to the rental car can be determined. Thus, access to the rental car is limited to those users having authorization to use the rental car.

Figure 15:
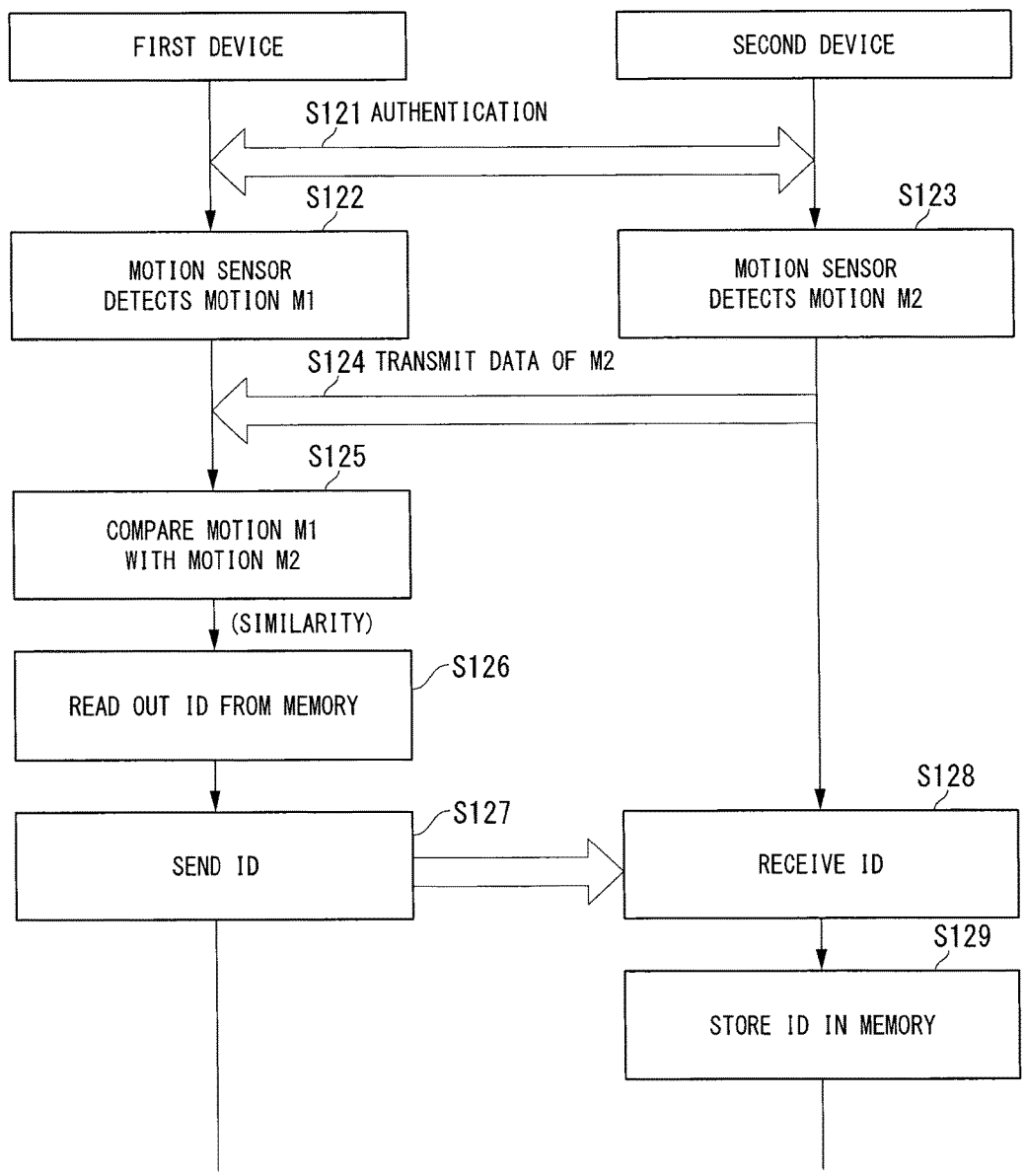
FIG. 15 shows a sequence diagram of an implementation of process of authenticating, comparing motion, and transmitting a password between a first and a second device and storing the password in the second device.

FIG. 15 shows a sequence diagram for a method of communication between two devices using, for example, human-body communication and comparing the motions of the two devices. In one implementation, the first device can be a wearable device 100, such as the wearable device 100 shown in FIG. 14. The second device can be a key, such as the key 1100 shown in FIG. 14.

In step S121, the first device establishes human-body communication with the second device and an authentication process is performed using human-body communication. By the authentication process, each device gathers information regarding the type and identity of the counterpart device.

In step S122, after completion of the authentication process, the first device detects the motion M1 when the first device is moved.

In step S123, the second device detects the motion M2 when the second device is moved. The respective motions M1 and M2 are detected using the motion sensors of the corresponding device. For example, the motions M1 and M2 can be detected using accelerometers and/or gyroscopes.

In step S124, the second device signals to the first device the motion M2, and the first device receives the motion M2 information from the second device. In step S125, the first device then compares the data for motion M2 received from the second device with the data for motion M1 measure by the first device. In one implementation, the two motions are compared using the same time-axis. If the two motions are determined to be similar, then the process continues to step S126. Otherwise, the motions are determined to be dissimilar and process repeats the steps S121-S125 until the motions are determined to be similar/synchronized, for example.

In step S126, the first device reads the ID code from the memory of the first device. In one implementation where the first device is wearable device 100 and the second device is the key 1100, if motion M1 and motion M2 are determined to be similar, then the wearable device 100 reads the ID code from the memory 150.

In step S127, the first device transmits the password transmitted to the first device. In one implementation, the ID code is transmitted from the wearable device 100 to the key 1100 using human-body communication.

In step S128, the second device receives the password transmitted during step S127.

In step S129, the second device stores the ID code in the memory of the second device. For example, the key 1100 can store the ID code in the memory of the wearable-device-communication terminal 1110. The ID code stored in the second device can later be used for an authentication process when the second device is used to access a target device. For example, when the second device is the key 1100, the ID code can be retrieved from the memory of the key 1100 and transmitted to a target device when the key 1100 is inserted in the key hole of the target device. Further, the target device can use the ID code to determine whether permission to access the target device is authorized according to the ID code.

Figure 16:
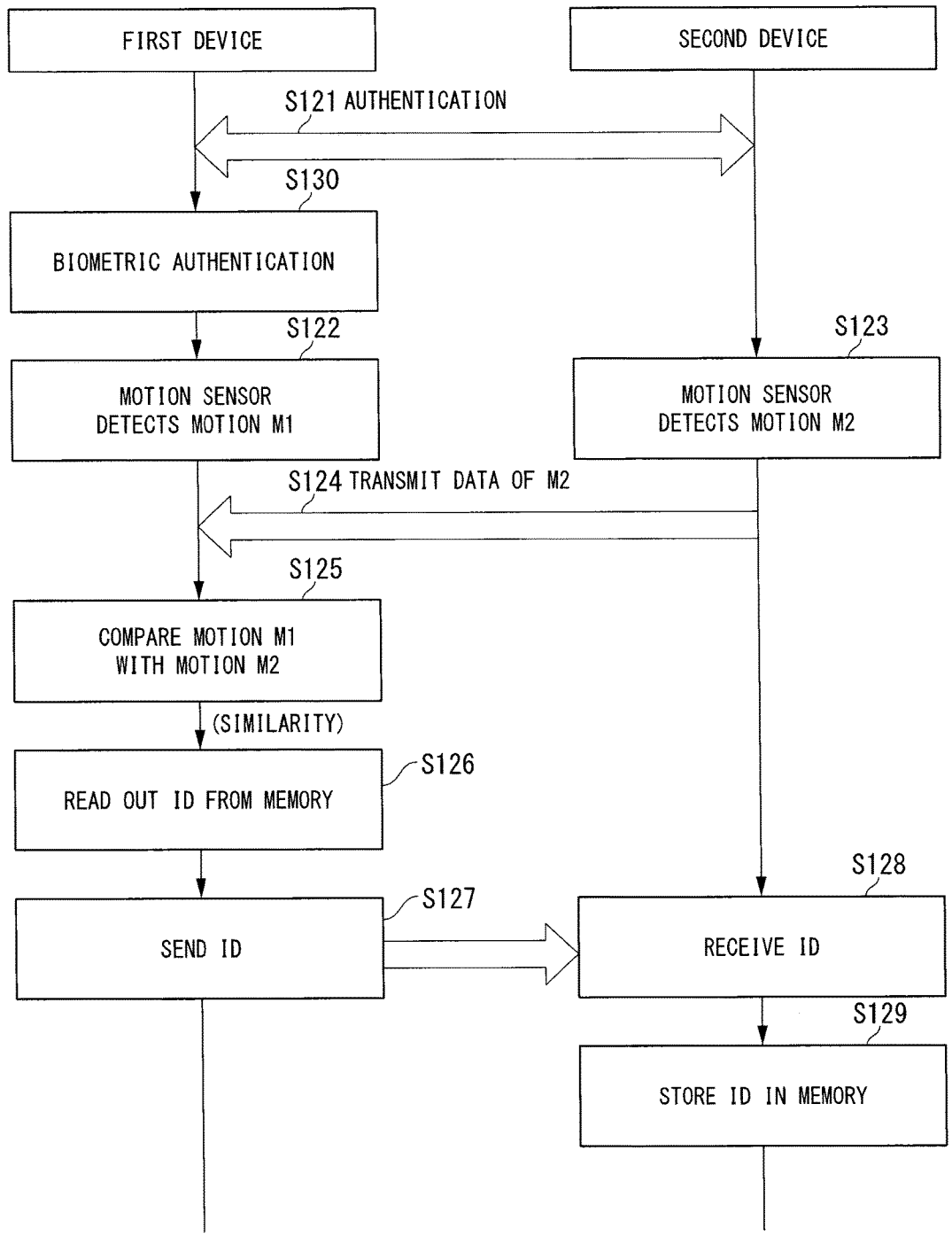
FIG. 16 shows a sequence diagram of an implementation of process of biometric authenticating, comparing motion, and transmitting a password between a first and a second device and storing the password in the second device.

FIG. 16 shows a first modification of the method shown in FIG. 15. After the authentication using human-body communication in step S121 and before the detection of the motion M1 of the first device, a biometric authentication step (i.e., step S130) is inserted. The process steps S121-S129 are the same as in FIG. 15.

In step S130, the first device uses biometric data to determine that the user is an authorized user of the first device. For example, if the first device is the wearable device 100, the touch panel 130 of the wearable device 100 can detect data of the user's fingerprint, and the fingerprint data can be compared to authenticated fingerprint data stored in the memory 150 to determine whether the user is an authorized user. In a second example, the wearable device 100 can include a camera that takes an image of the user's face or iris, and the digital image can be used in an authentication process according to biometric data of authorized users stored in the memory 150. After the authentication process of step S130 is completed, the wearable device 100 proceeds to the motion detection process of step S122. Thus, by performing a biometric authentication process, only preauthorized users wearing the wearable device 100 are able to access the ID code stored in the wearable device 100, and only preauthorized users can use the wearable device 100 to transmit the stored ID code to the second device. Therefore, unauthorized use of the wearable device 100 can advantageously be prevented according to the process shown in FIG. 16.

Figure 17:
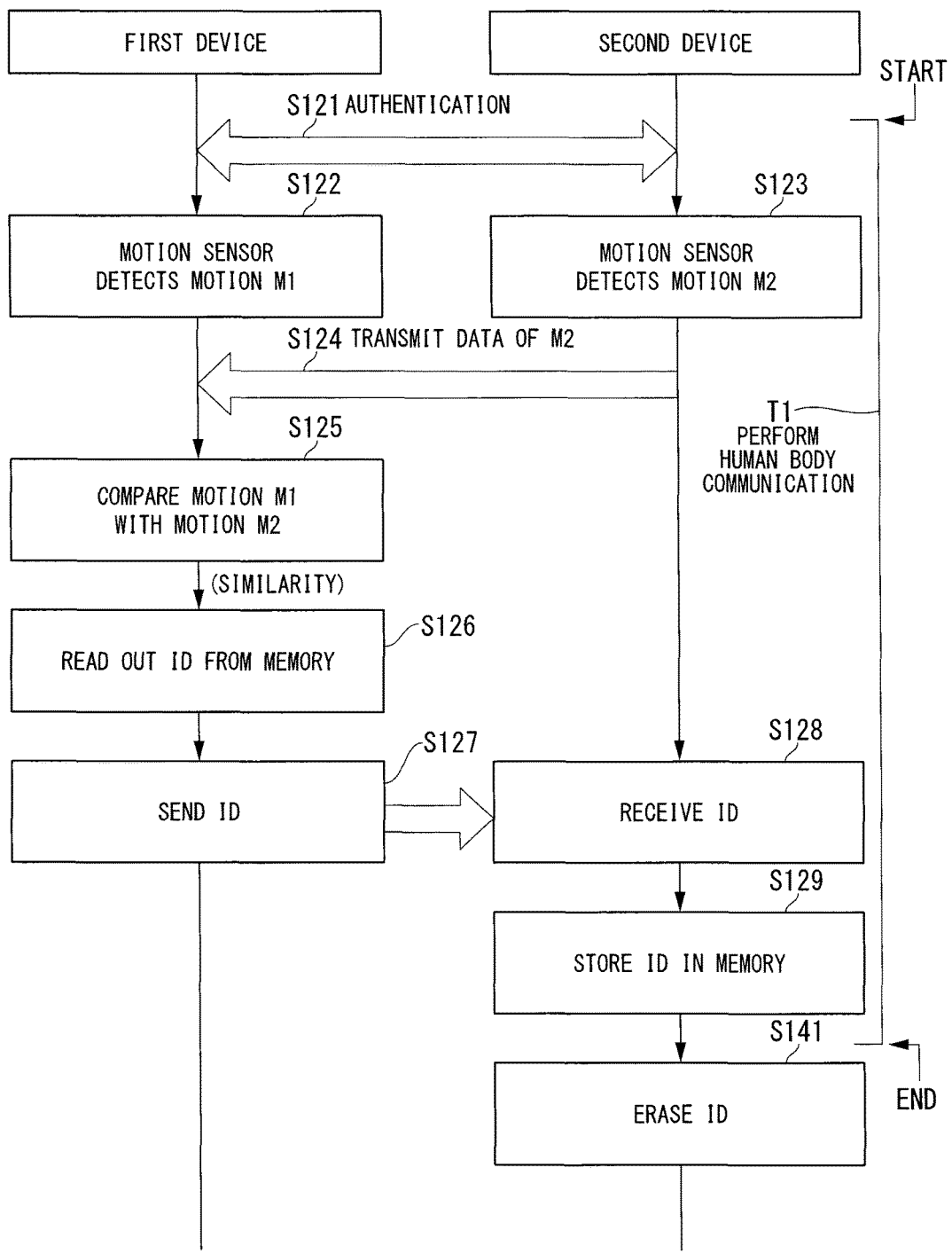
FIG. 17 shows a sequence diagram of an implementation of process of authenticating, comparing motion, and transmitting a password between a first and a second device and storing the password in the second device, and then erasing the password from the second device when human-body communication is interrupted between the first device and the second device.

FIG. 17 shows a second modification of the process shown in FIG. 15. The processes of steps S121-S129 are the same as in FIG. 15. In FIG. 17 human-body communication is performed continuously throughout steps S121-S129 continuing after the ID code is stored in the memory of the second device and continuing until the human-body communication between the two devices is terminated by, e.g., the user releasing the second device. As shown in FIG. 17, human-body communications are performed continuously during the period T1 shown on the right hand side of FIG. 17. While the user is in contact with the electrodes of the first and second devices human-body communications can continue, but when the user breaks contact (or in certain implementations close proximity) with the electrode of either the first device or the second device the human-body communications will terminate and the period T1 comes to an end.

When human-body communications cease the ID code stored in the second device is erased, as shown in FIG. 17 in the step S141. Therefore, the ID code is only effective in the second device while the user is grasping/contacting the first and second devices simultaneously. For example, if the first device is the wearable device 100 and the second device is the key 1100, the ID code is only effective in the key 1100 while the user is wearing the wearable device 100 and grasping the key 1100 by the hand, and the ID code is erased from the key 1100 when the key 1100 is released from the hand.

Figure 18:
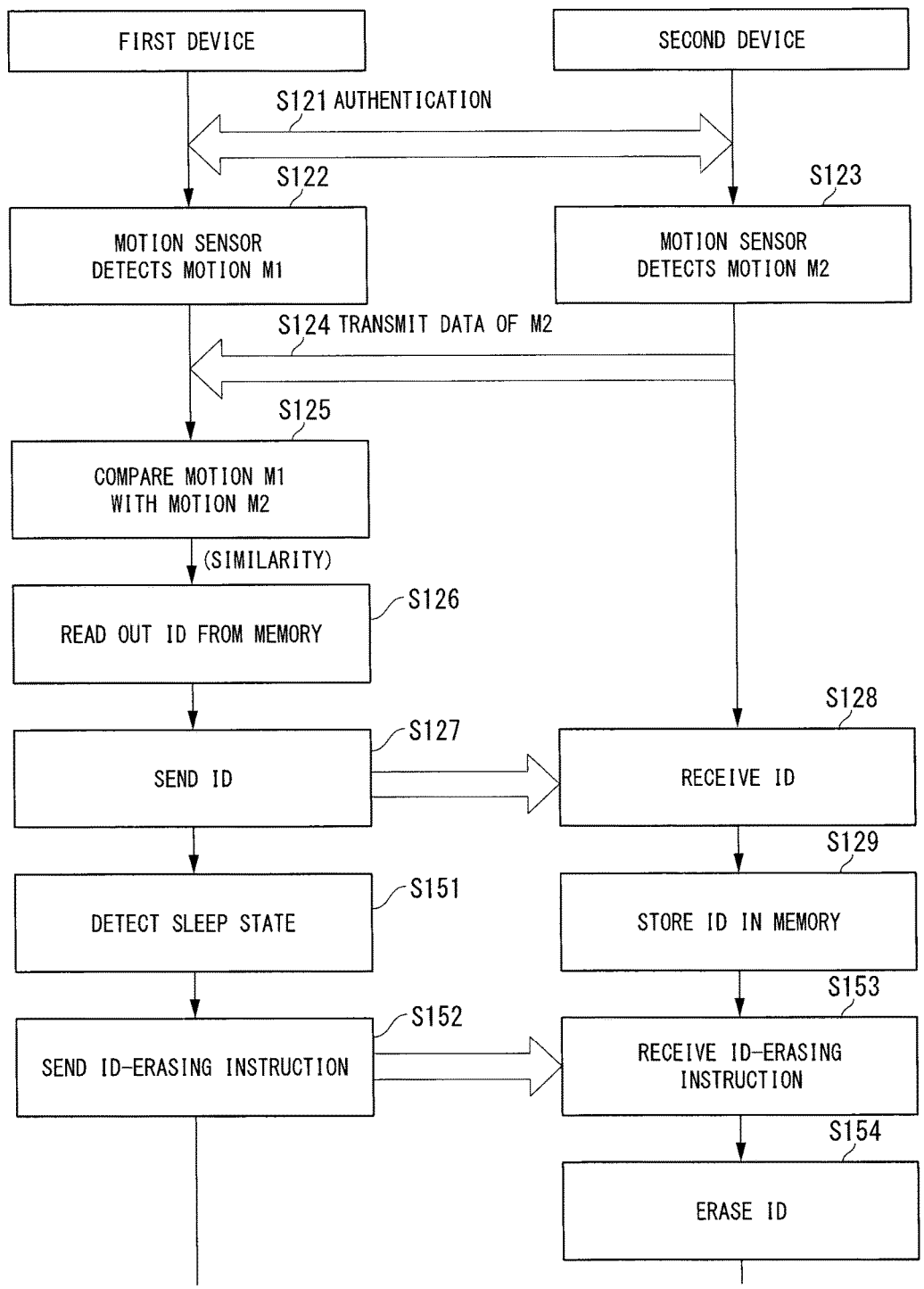
FIG. 18 shows a sequence diagram of an implementation of process of authenticating, comparing motion, and transmitting a password between a first and a second device and storing the password in the second device, and then erasing the password from the second device when the user is detected to be in a sleep state.

FIG. 18 shows a third modification of the method process shown in FIG. 15. The processes of steps S121-S129 are the same as in FIG. 15. In FIG. 18, the steps S151-S154 monitor whether the user is in a sleep state and instructs the second device, such as the key 1100, to erase the ID code when the user is detected to be in a sleep state.

In step S151, the first device detects when the user is in a sleep state. For example, the first device can use data from the motion sensors to infer the user is in a sleep state when the user's movements of the first device are indicative of the user being in a sleep state. Additionally, the first device can include other sensors such as a pulse monitor that can further provide data indicating when the user is sleeping. When the user is determined to be sleeping the first device continues to step S152. Otherwise, the first device continues to monitor the users sleep/wake state, for example.

In step S152, the first device transmits, using human-body communication, an instruction to erase the ID code from the wearable-device-communication terminal 1110 of the key 1100.

In step S153, the second device receives the instruction to erase the ID code from the wearable-device-communication terminal 1110 of the key 1100.

In step S154, the second device erases the ID code from the wearable-device-communication terminal 1110 of the key 1100 in accordance with the instruction received in step S153. Thus, when a user is in a sleep state, unauthorized use of the second device can advantageously be avoided by erasing the ID code stored in the wearable-device-communication terminal 1110.

In one implementation, the transmission, in step S152, of the instruction to erase the ID code can be performed using a communication channel other than human-body communication. For example the transmission of the instruction to erase the ID code can be sent using a wireless LAN or using Bluetooth®.

Figure 19:
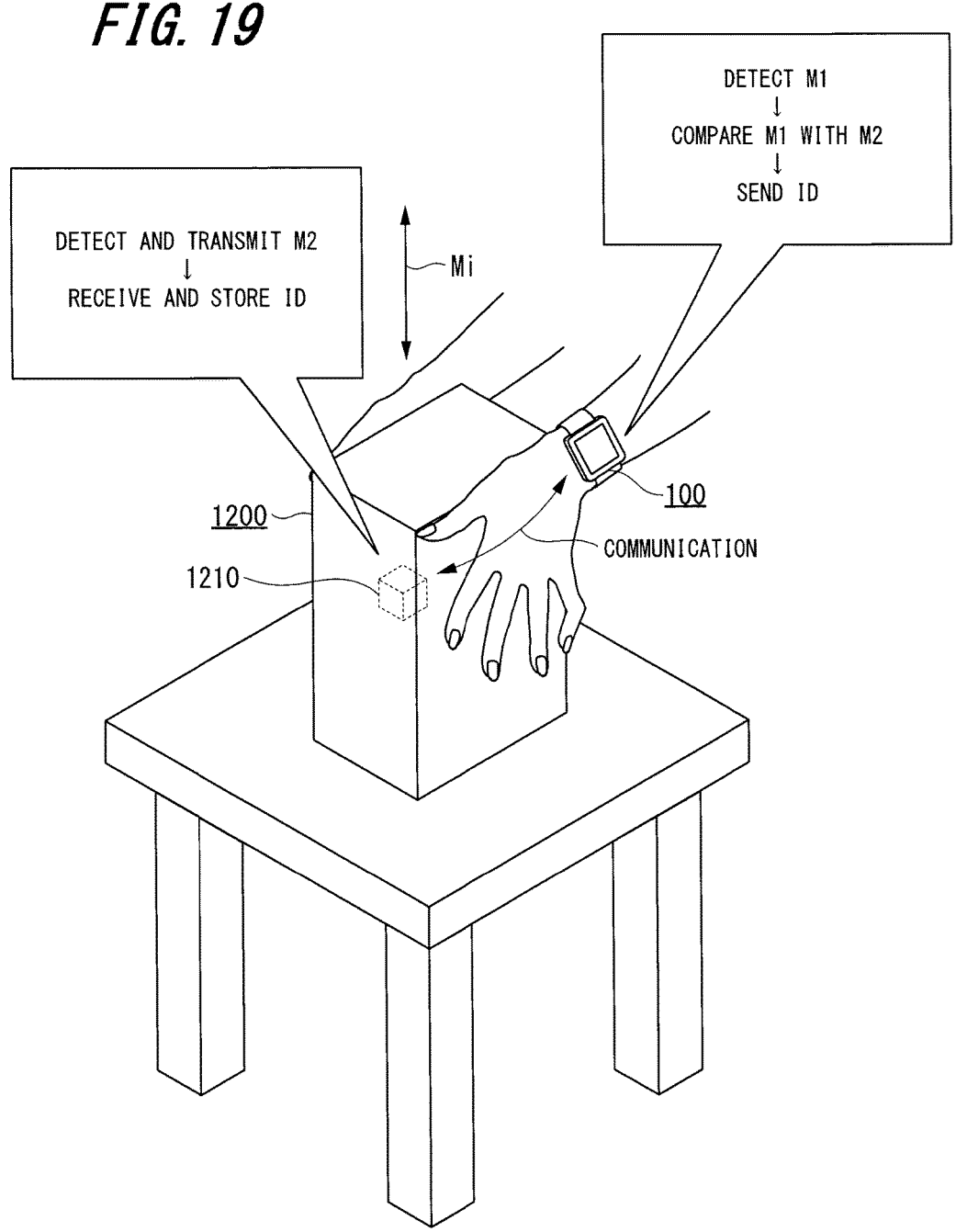
FIG. 19 shows a drawing of an implementation a process of comparing motions between a wearable device and a storage device at a checkpoint to transmit and store an ID code from the wearable device to the storage device.

FIG. 19 shows another example of two devices using human-body communication and performing a comparison between the respective motions of the two devices. If the compared motions are determined to be similar/synchronized, then the devices perform a predefined instruction. In FIG. 19 the first device is a wearable device 100, and the second device is a data accumulation device 1200 having a wearable-device-communication terminal 1210. The data accumulation device 1200 is configured to accumulate and store multiple ID codes from various users that access the data accumulation device 1200. The data accumulation 1200 can be located at a checkpoint, for example, and the users can gain access to the checkpoint or store their respective ID codes in the data accumulation device 1200 by contacting and moving the data accumulation device 1200 as described below. Using human-body communication, each ID code is acquired and stored in the data accumulation device 1200 from the corresponding wearable device 100 when the user grasps the data accumulation device 1200 by hand and moves the data accumulation device 1200.

For example, in an orienteering course or competition, participants navigate between points and the data accumulation device 1200 can be used to store the ID codes of the respective participants as an indication that the participants were present at the checkpoint corresponding to the data accumulation device 1200. Additionally, the data accumulation device 1200 can be used in other applications involving checkpoints, such that participants demonstrate their presence at the checkpoint by contacting and moving the data accumulation device 1200. For example, a participant wearing the wearable device 100 can lift the data accumulation device 1200, as shown by the arrow Mi. When participant touches the data accumulation device 1200, the wearable device 100 performs human-body communication with the wearable-device-communication terminal 1210 in the data accumulation device 1200, and the wearable device 100 and the wearable-device-communication terminal 1210 each authenticate the respective counterpart device (i.e., the wearable device 100 authenticates the wearable-device-communication terminal 1210 and vice versa) using human-body communication. Thus, the data accumulation device 1200 records each of the participants of the orienteering course as the participants demonstrate their presence at the checkpoint by lifting the data accumulation device 1200.

As shown in FIG. 19, the user wears on their wrist the wearable device 100 and grasps the data accumulation device 1200 by the hand. The electrode 191 of the wearable device 100 contacts the user, and an electrode of the wearable-device-communication terminal 1210 contacts the user. When this occurs, human-body communication is initiated between the wearable device 100 and the wearable-device-communication terminal 1210 of the data accumulation device 1200. As shown by the arrow Mi, when a user lifts the data accumulation device 1200, the motion sensor in the wearable-device-communication terminal 1210 detects the motion M2. Also at this time, the wearable device 100 detects the motion M1, which is also generated by the movement of the wearable device 100, as indicated by arrow M1. Data representing the motion M2 that is measured by the wearable-device-communication terminal 1210 of the data accumulation device 1200 is transmitted to the wearable device 100 using human-body communication, where the data is received. The wearable device 100 then compares the received data of motion M2 with data corresponding motion M1 and determines whether the two motions are similar (or alternatively synchronized). When the two motions are determined to be similar (or alternatively synchronized) the wearable device 100 sends an ID code to the data accumulation device 1200. The ID code uniquely identifies the user. In one implementation, the ID code is sent, using human-body communication, from the wearable device to the wearable-device-communication terminal 1210 of the data accumulation device 1200. The wearable-device-communication terminal 1210 next receives and stores in memory the ID code.

Thus, the data accumulation device 1200 can be used to accumulate and store the ID codes of users present at the checkpoint and lifting the data accumulation device 1200. The presence of the users at a checkpoint can later be verified by referencing the memory of the data accumulation device 1200, such that the data accumulation device 1200 can advantageously be used for orienteering competitions and similar events using checkpoint verification.

In the examples described herein (e.g., the methods and processes described in reference to FIGS. 4, 13, 15-18), human-body communication is used to perform authentication and to communicate signals between the wearable device 100 and a counterpart device (e.g., a device equipped with a wearable-device-communication terminal similar to 310 shown in FIG. 3). However, communication channels other than human-body communication can also be used to communicate and transmit signals and perform authentication between a wearable device 100 and a counterpart device. For example, the short-distance wireless communication processor 170 and corresponding antenna 171 can be used to transmit instructions between a wearable device 100 and a counterpart device. For example, in the example methods described herein, the wearable device 100 can communicate with the wearable-device-communication terminal of the counterpart device using a wireless LAN or Bluetooth®, rather than using human-body communication. Moreover, in example methods described herein, the wearable device 100 can initiate communications with the counterpart device (e.g., in the authentication step S101) using human-body communication, and thereafter the method can use another communication channel other than human-body communication for subsequent communication between the wearable device 100 and the counterpart device. For example, subsequent communications between the wearable device 100 and the counterpart device can be performed using a wireless LAN or Bluetooth®, for example.

Figure 20:
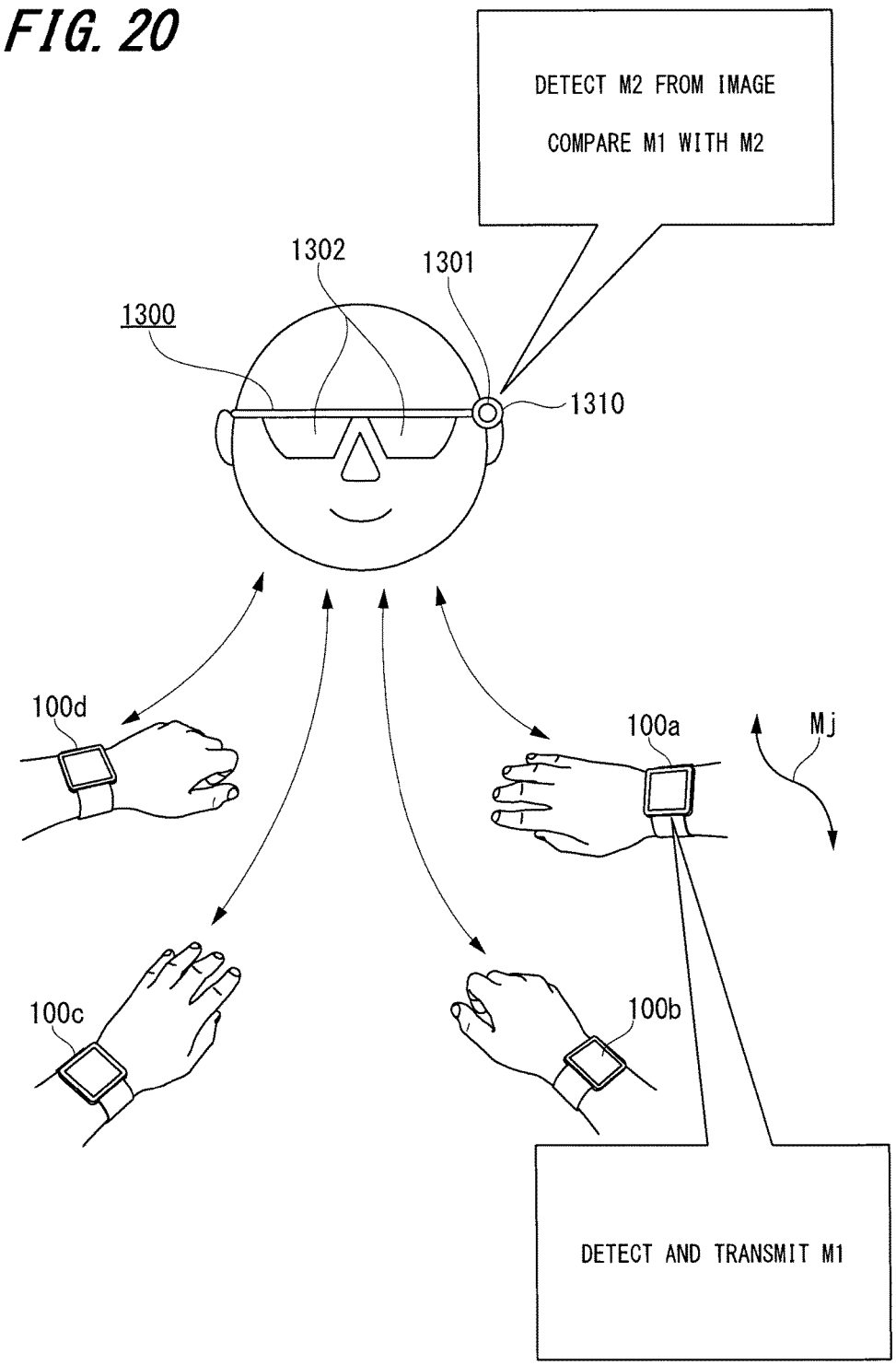
FIG. 20 shows a drawing of an implementation a process of comparing detected motions between a wearable device and an imaging device to establish communication between the wearable device and the imaging device.

FIG. 20 shows an example of establishing communication between the wearable device 100 and a counterpart device using a communication channel other than human-body communication. When communication and authentication between the wearable device 100 and the counterpart device is performed using a wireless LAN or Bluetooth®, the counterpart device might have multiple wearable device 100 within the wireless communication range. Therefore, the counterpart device will perform a process whereby the counterpart device can select a selected wearable device with which to interact. For example, the user might position in the selected wearable device within the field of view of a counterpart device that is an imaging device and use correlated measurements detected by the selected wearable device and the counterpart device to select the selected wearable device from among the plurality of the wearable device within the communication range. Thus, the motion of the selected wearable device can advantageously be used to select among a plurality of the wearable device.

As shown in FIG. 20, a smart-glass device 1300 that is an imaging device can select among the wearable devices 100*a*, 100*b*, 100*c*, and 100*d* to select the selected wearable device 100*a*. Here, the wearable devices each communicate with the smart-glass device 1300 using a wireless LAN, for example. The smart-glass device 1300 can be configured to be arranged on the head of a user so as to cover the user's eyes and to resemble eye glasses. The smart-glass device 1300 can include a display 1302 and a wearable-device-communication terminal 1310. The wearable-device-communication terminal 1310 of the smart-glass device 1300 can include a camera 1301. In this example, each of the wearable devices 100*a*, 100*b*, 100*c*, and 100*d* is arranged on the wrist of a different user, and the user wearing the smart-glass device 1300 is not one of the users wearing the wearable devices 100*a*, 100*b*, 100*c*, and 100*d*.

Further in this example, the wearable device 100*a* is within the field of view of the camera 1301, and the wearable devices 100*b*, 100*c*, and 100*d* are not within the field of view of the camera 1301. However, are the wearable devices 100*b*, 100*c*, and 100*d* are within communication range of the wearable-device-communication terminal 1310. The wearable device 100*a* is moved according to the motion operation Mj shown in FIG. 20, and the motion sensors of the wearable device 100*a* detects motion M1. The smart-glass device 1300 also detects the motion M2 using the camera 1301 and image processing and image recognition processes performed on captured images obtained using the camera 1301. The motion M1 is communicated, using the wireless LAN, to the wearable-device-communication terminal 1310 of the smart-glass device 1300, and the motion M1 is compared to the image detected motion M2 to determine whether the two motions are similar (or alternatively synchronized). When the two motions are determined to be similar (or alternatively synchronized), the smart-glass device 1300 determines that the wearable device 100a is the selected wearable device and the smart-glass device 1300 selects the wearable device 100a from among the wearable devices within communication range. Further, the smart-glass device 1300 can perform an authentication process with the wearable device 100a can can continue communications with the wearable device 100a using the wireless LAN. By performing this motion comparison process, each device can advantageously recognize that it is communicating with the desired counterpart based on the comparison derived from the respective motion measurements.

In addition to the above examples where the wearable device 100 is exemplified using a wristwatch-type wearable terminal, the above processes and methods could also be performed using a smartphone, a tablet computer, or any other electronic device capable of communicating and performing functions substantially similar to those attributed to the wearable device 100. Moreover, the methods and processes described herein are also applicable to devices differing from those devices described herein but having similar functionality that enables the different devices to perform the processes described herein. Additionally, in the example methods described herein, the choice of a device for each example in non-limiting, and the methods can be realized using any other device exhibiting substantially similar functionality to that functionality described in the exemplary methods.

The methods and processes described herein can be realized using existing devices and electronic devices by, for example, loading an application program on to the existing devices that enable the existing devices to perform methods substantially similar to the methods described herein. The invention also includes those services, provided by a service provider, that when run on an existing electronic device enable the existing electronic device to perform the methods described herein. Further, the invention includes an application program stored a computer readable medium such as a memory card or a disk or an application program that can be delivered to the electronic device via the internet, where the application program when run on an electronic device enables the electronic device to perform the methods and processes described herein.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A first device configured to communicate with a second device, the first device comprising:
   a communication processor configured to communicate with the second device;
   a motion sensor configured to detect a motion of the first device and to generate first motion data representing the motion of the first device; and
   circuitry configured to
      determine whether the first motion data is substantially the same as second motion data received from the second device, and
      issue a first instruction when the first motion data is determined to be substantially the same as the second motion data, wherein
   the communication processor communicates with the second device using human-body communication, wherein the first device sends and receives electromagnetic signals using a human body of a user as a transmission line for the electromagnetic signals.

2. The first device according to claim 1, wherein
   the first device is a wearable technology device that is configured to be worn on the body of a user, and
   the first instruction instructs the communication processor of the first device to communicate an unlock signal to the second device that signals to the second device to perform an unlock process unlocking the second device.

3. The first device according to claim 1, further comprising:
   a display screen, wherein
   the first instruction instructs the communication processor of the first device to communicate a residual-battery-level request to the second device that requests information indicating a residual-battery charge of a battery of the second device, and
   the display screen is configured to display the residual-battery charge when the information indicating a residual-battery charge is received by the first device.

4. The first device according to claim 1, further comprising:
   a computer-readable medium configured to store an identification code,
   wherein the first instruction instructs the communication processor of the first device to communicate to the second device the identification code stored in the computer-readable medium.

5. The first device according to claim 1, further comprising:
   a computer-readable medium configured to store an identification code; and
   another communication processor configured to communicate with the second device,
   wherein the first instruction instructs the communication processor of the first device to communicate to the second device the identification code stored in the computer-readable medium, and
   the circuitry of the first device is further configured to
      determine whether communication between the communication processor and the second device is terminated, and
      issue a second instruction instructing the another communication processor to signal the second device to erase the identification code from a medium of the second device when communication between the communication processor and the second device is determined to be terminated.

6. The first device according to claim 1, further comprising:
   a computer-readable medium configured to store an identification code,
   wherein the first instruction instructs the communication processor of the first device to communicate to the second device the identification code stored in the computer-readable medium, and
   the circuitry of the first device is further configured to
   determine whether the user is in a sleep state, and
   issue a second instruction instructing the communication processor to signal the second device to erase the identification code from a medium of the second device when the user is determined to be in a sleep state.

7. The first device according to claim 1, wherein the circuitry determines that the first motion data is substantially the same as the second motion data when a value of a correlation function between the first motion data and the second motion data exceeds a predefined threshold.

8. The first device according to claim 1, wherein the circuitry determines that the first motion data is substantially the same as the second motion data when an acceleration indicated by the first motion data is synchronized to an acceleration indicated by the second motion data for more than a predefined percentage of the first motion data and the second motion data.

9. A first device configured to communicate with a second device, the first device comprising:
   a communication processor configured to communicate with the second device;
   a motion sensor configured to detect a motion of the first device and to generate first motion data representing the motion of the first device;
   a display screen; and
   circuitry configured to
      determine whether the first motion data is substantially the same as second motion data received from the second device, and
      issue a first instruction when the first motion data is determined to be substantially the same as the second motion data, wherein
   the first instruction instructs the communication processor of the first device to communicate a residual-battery-level request to the second device that requests information indicating a residual-battery charge of a battery of the second device, and
   the display screen is configured to display the residual-battery charge when the information indicating a residual-battery charge is received by the first device.

10. The first device according to claim 9, wherein the first device is a wearable technology device that is configured to be worn on the body of a user.

11. The first device according to claim 10, wherein the first instruction further instructs the communication processor of the first device to communicate an unlock signal to the second device that signals to the second device to perform an unlock process unlocking the second device.

12. A first device configured to communicate with a second device, the first device comprising:
   a communication processor configured to communicate with the second device;
   a motion sensor configured to detect a motion of the first device and to generate first motion data representing the motion of the first device;
   a computer-readable medium configured to store an identification code representing an identity of a user; and
   circuitry configured to
      determine whether the first motion data is substantially the same as second motion data received from the second device, and
      issue a first instruction when the first motion data is determined to be substantially the same as the second motion data, and the first instruction instructs the communication processor of the first device to communicate to the second device the identification code stored in the computer-readable medium.

13. The first device according to claim 12, wherein the circuitry is further configured to issue the first instruction to instruct the communication processor of the first device to communicate to the second device the identification code stored in the computer-readable medium, and the identification code includes one of biometric data of the user, a competitor code, a participant code, an event code, an access authorization code, a unique identifier of the user, and a password.

14. The first device according to claim 12, wherein the circuitry is further configured to issue the first instruction to instruct the communication processor of the first device to communicate to the second device the identification code stored in the computer-readable medium, and the identification code stored in the computer-readable medium is used to obtain authorization to access to a third device.

15. The first device according to claim 12, wherein the motion sensor is further configured to detect the motion of the first device, and the motion of the first device has constrained degrees of freedom when the first device moves together with the second device.

16. The first device according to claim 15, wherein the motion sensor is further configured to detect the motion of the first device, wherein
   the motion of the first device is constrained to be a rotating motion, when the second device is a knob, a key, or a rotary switch, and
   the motion of the first device is constrained to be a sliding motion, when the second device is configured to be inserted into a slot.

17. The first device according to claim 15, wherein
   the first device is a wearable technology device that is configured to be worn on the body of a user, and
   the first instruction instructs the communication processor of the first device to communicate an unlock signal to the second device that signals to the second device to perform an unlock process unlocking the second device.

18. The first device according to claim 15, further comprising:
   another communication processor configured to communicate with the second device,
   wherein the circuitry of the first device is further configured to
      determine whether communication between the communication processor and the second device is terminated, and
      issue a second instruction instructing the another communication processor to signal the second device to erase the identification code from a medium of the second device when communication between the communication processor and the second device is determined to be terminated.

19. The first device according to claim 15, wherein the circuitry of the first device is further configured to
   determine whether the user is in a sleep state, and
   issue a second instruction instructing the communication processor to signal the second device to erase the identification code from a medium of the second device when the user is determined to be in a sleep state.

20. The first device according to claim 15, wherein the circuitry determines that the first motion data is substantially the same as the second motion data when one of
   a value of a correlation function between the first motion data and the second motion data exceeds a predefined threshold, and
   an acceleration indicated by the first motion data is synchronized to an acceleration indicated by the second motion data for more than a predefined percentage of the first motion data and the second motion data.

* * * * *